US012812124B2

(12) United States Patent
Hendry et al.

(10) Patent No.: US 12,812,124 B2
(45) **Date of Patent: *Nov. 24, 2026**

(54) IMAGE ENCODING/DECODING METHOD AND APPARATUS FOR SELECTIVELY ENCODING SIZE INFORMATION OF RECTANGULAR SLICE, AND METHOD FOR TRANSMITTING BITSTREAM

(71) Applicant: Nokia Technologies Oy, Espoo (FI)

(72) Inventors: Hendry Hendry, Seoul (KR); Seung Hwan Kim, Seoul (KR); Seethal Paluri, Seoul (KR)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 19/236,951

(22) Filed: Jun. 12, 2025

(65) Prior Publication Data

US 2025/0310531 A1 Oct. 2, 2025

Related U.S. Application Data

(63) Continuation of application No. 18/222,230, filed on Jul. 14, 2023, now Pat. No. 12,355,973, which is a continuation of application No. 17/939,621, filed on Sep. 7, 2022, now Pat. No. 11,743,469, which is a continuation of application No. PCT/KR2021/002822, filed on Mar. 8, 2021.

(60) Provisional application No. 62/987,336, filed on Mar. 9, 2020.

(51) Int. Cl.

| | |
|---|---|
| *H04N 7/12* | (2006.01) |
| *H04N 19/136* | (2014.01) |
| *H04N 19/172* | (2014.01) |
| *H04N 19/174* | (2014.01) |

(52) U.S. Cl.
CPC ......... *H04N 19/136* (2014.11); *H04N 19/172* (2014.11); *H04N 19/174* (2014.11)

(58) Field of Classification Search
CPC ............... H04N 19/136; H04N 19/172; H04N 19/174; H04N 19/11; H04N 19/13; H04N 19/176; H04N 19/70; H04N 19/119; H04N 19/122; H04N 19/184
See application file for complete search history.

(56) References Cited

U.S. PATENT DOCUMENTS

| | | | | |
|---|---|---|---|---|
| 11,218,713 | B2 * | 1/2022 | Hendry | H04N 19/436 |
| 2019/0349582 | A1 | 11/2019 | Bordes et al. | |
| 2022/0030237 | A1 * | 1/2022 | Paluri | H04N 19/70 |
| 2022/0248044 | A1 * | 8/2022 | Chen | H04N 19/105 |

(Continued)

OTHER PUBLICATIONS

Bross B. et al., "Versatile Video Coding (Draft 8)", Joint Video Experts Team (JVET) of ITU-T SG 16 WP 3 and ISO/IEC JTC 1/SC 29/WG 11 17th Meeting: Brussels, BE, JVET-Q2001-vB. Jan. 27, 2020 pp. 10-11, 30.

*Primary Examiner* — Gims S Philippe
(74) *Attorney, Agent, or Firm* — Nokia Technologies Oy

(57) ABSTRACT

Disclosed herein are an image encoding/decoding method and apparatus. An image decoding method performed by an image encoding apparatus may include acquiring size information indicating a size of a current slice corresponding to at least a portion of a current picture from a bitstream and determining the size of the current slice based on the size information.

8 Claims, 27 Drawing Sheets

(56) References Cited

U.S. PATENT DOCUMENTS

| | | | | |
|---|---|---|---|---|
| 2023/0007270 | A1 * | 1/2023 | Esenlik ................ | H04N 19/119 |
| 2023/0208094 | A1 * | 6/2023 | Kumazaki ............. | H01S 3/1305<br>355/67 |

* cited by examiner

ENTROPY ENCODER

FIG. 25

| seq_parameter_set_rbsp( ) { | Descriptor |
|---|---|
| ... | |
| **subpic_info_present_flag** | u(1) |
| if( subpic_info_present_flag ) { | |
| **sps_num_subpics_minus1** | ue(v) |
| **sps_independent_subpics_flag** | u(1) |
| for( i = 0; sps_num_subpics_minus1 > 0 && i <= sps_num_subpics_minus1; i++ ) { | |
| if( i > 0 && pic_width_max_in_luma_samples > CtbSizeY ) | |
| **subpic_ctu_top_left_x**[ i ] | u(v) |
| if( i > 0 && pic_height_max_in_luma_samples > CtbSizeY ) { | |
| **subpic_ctu_top_left_y**[ i ] | u(v) |
| if( i < sps_num_subpics_minus1 && pic_width_max_in_luma_samples > CtbSizeY ) | |
| **subpic_width_minus1**[ i ] | u(v) |
| if( i < sps_num_subpics_minus1 && pic_height_max_in_luma_samples > CtbSizeY ) | |
| **subpic_height_minus1**[ i ] | u(v) |
| if( !sps_independent_subpics_flag) { | |
| **subpic_treated_as_pic_flag**[ i ] | u(1) |
| **loop_filter_across_subpic_enabled_flag**[ i ] | u(1) |
| } | |
| } | |
| } | |
| ... | |
| } | |

FIG. 26

| pic_parameter_set_rbsp( ) { | **Descriptor** |
|---|---|
| ... | |
| **no_pic_partition_flag** | u(1) |
| if( !no_pic_partition_flag ) { | |
| **pps_log2_ctu_size_minus5** | u(2) |
| **num_exp_tile_columns_minus1** | ue(v) |
| **num_exp_tile_rows_minus1** | ue(v) |
| for( i = 0; i <= num_exp_tile_columns_minus1; i++ ) | |
| **tile_column_width_minus1**[ i ] | ue(v) |
| for( i = 0; i <= num_exp_tile_rows_minus1; i++ ) | |
| **tile_row_height_minus1**[ i ] | ue(v) |
| if( NumTilesInPic > 1 ) | |
| **rect_slice_flag** | u(1) |
| if( rect_slice_flag ) | |
| **single_slice_per_subpic_flag** | u(1) |
| if( rect_slice_flag && !single_slice_per_subpic_flag ) { | |
| **num_slices_in_pic_minus1** | ue(v) |
| if( num_slices_in_pic_minus1 > 0 ) | |
| **tile_idx_delta_present_flag** | u(1) |
| for( i = 0; i < num_slices_in_pic_minus1; i++ ) { | |
| if( NumTileColumns > 1 ) | |
| **slice_width_in_tiles_minus1**[ i ] | ue(v) |
| if( NumTileRows > 1 && ( tile_idx_delta_present_flag \|\| SliceTopLeftTileIdx[ i ] % NumTileColumns = = 0 ) ) | |
| **slice_height_in_tiles_minus1**[ i ] | ue(v) |
| if( slice_width_in_tiles_minus1[ i ] = = 0 && slice_height_in_tiles_minus1[ i ] = = 0 && RowHeight[ SliceTopLeftTileIdx[ i ] / NumTileColumns ] > 1 ) { | |
| **num_exp_slices_in_tile**[ i ] | ue(v) |
| for( j = 0; j < num_exp_slices_in_tile[ i ]; j++ ) | |
| **exp_slice_height_in_ctus_minus1**[ i ][ j ] | ue(v) |
| i += NumSlicesInTile[ i ] − 1 | |
| } | |
| if( tile_idx_delta_present_flag && i < num_slices_in_pic_minus1 ) | |
| **tile_idx_delta**[ i ] | se(v) |
| } | |
| } | |
| **loop_filter_across_tiles_enabled_flag** | u(1) |
| **loop_filter_across_slices_enabled_flag** | u(1) |
| } | |
| ... | |
| } | |

| slice_header( ) { | **Descriptor** |
|---|---|
| ... | |
| if( subpic_info_present_flag ) | |
| **slice_subpic_id** | u(v) |
| if( ( rect_slice_flag && NumSlicesInSubpic[ CurrSubpicIdx ] > 1 ) \|\| ( !rect_slice_flag && NumTilesInPic > 1 ) ) | |
| **slice_address** | u(v) |
| for( i = 0; i < NumExtraShBits; i++ ) | |
| **sh_extra_bit**[ i ] | u(1) |
| if( !rect_slice_flag && NumTilesInPic > 1 ) | |
| **num_tiles_in_slice_minus1** | ue(v) |
| ... | |
| } | |

FIG. 30

| pic_parameter_set_rbsp( ) { | **Descriptor** |
|---|---|
| ... | |
| **no_pic_partition_flag** | u(1) |
| if( !no_pic_partition_flag ) { | |
| ... | |
| if( rect_slice_flag && !single_slice_per_subpic_flag ) { | |
| **num_slices_in_pic_minus1** | ue(v) |
| if( num_slices_in_pic_minus1 > 0 ) | |
| **tile_idx_delta_present_flag** | u(1) |
| for( i = 0; i < num_slices_in_pic_minus1; i++ ) { | |
| if( NumTileColumns > 1 && ( SliceTopLeftTileIdx[ i ] % NumTileColumns != NumTileColumns − 1 ) ) | |
| **slice_width_in_tiles_minus1**[ i ] | ue(v) |
| if( NumTileRows > 1 &&( tile_idx_delta_present_flag \|\| SliceTopLeftTileIdx[ i ] % NumTileColumns = = 0 ) && ( SliceTopLeftTileIdx[ i ] / NumTileColumns != NumTileRows − 1 ) ) | |
| **slice_height_in_tiles_minus1**[ i ] | ue(v) |
| ... | |
| } | |
| } | |
| ... | |
| } | |
| ... | |
| } | |

FIG. 31

| pic_parameter_set_rbsp( ) { | **Descriptor** |
|---|---|
| ... | |
| **no_pic_partition_flag** | u(1) |
| if( !no_pic_partition_flag ) { | |
| ... | |
| if( rect_slice_flag && !single_slice_per_subpic_flag ) { | |
| **num_slices_in_pic_minus1** | ue(v) |
| if( num_slices_in_pic_minus1 > 0 ) | |
| **tile_idx_delta_present_flag** | u(1) |
| for( i = 0; i < num_slices_in_pic_minus1; i++ ) { | |
| if( SliceTopLeftTileIdx[ i ] % NumTileColumns != NumTileColumns − 1 ) | |
| **slice_width_in_tiles_minus1**[ i ] | ue(v) |
| if( ( SliceTopLeftTileIdx[ i ] / NumTileColumns != NumTileRows − 1 ) &&( tile_idx_delta_present_flag \|\| SliceTopLeftTileIdx[ i ] % NumTileColumns = = 0 ) ) | |
| **slice_height_in_tiles_minus1**[ i ] | ue(v) |
| ... | |
| } | |
| } | |
| ... | |
| } | |
| ... | |
| } | |

FIG. 33

```
tileIdx = 0
for( i = 0; i <= pps_num_slices_in_pic_minus1; i++ )
    NumCtusInSlice[ i ] = 0
for( i = 0; i <= pps_num_slices_in_pic_minus1; i++ ) {
    SliceTopLeftTileIdx[ i ] = tileIdx
    tileX = tileIdx % NumTileColumns
    tileY = tileIdx / NumTileColumns
    if( i < pps_num_slices_in_pic_minus1 ) {
        sliceWidthInTiles[ i ] = pps_slice_width_in_tiles_minus1[ i ] + 1
        sliceHeightInTiles[ i ] = pps_slice_height_in_tiles_minus1[ i ] + 1
    } else {
        sliceWidthInTiles[ i ] = NumTileColumns − tileX
        sliceHeightInTiles[ i ] = NumTileRows − tileY
        NumSlicesInTile[ i ] = 1
    }
    if( sliceWidthInTiles[ i ] = = 1 && sliceHeightInTiles[ i ] = = 1 ) {
        if( pps_num_exp_slices_in_tile[ i ] = = 0 ) {
            NumSlicesInTile[ i ] = 1
            sliceHeightInCtus[ i ] = RowHeightVal[ SliceTopLeftTileIdx[ i ] / NumTileColumns ]
        } else {
            remainingHeightInCtbsY = RowHeightVal[ SliceTopLeftTileIdx[ i ] / NumTileColumns ]
            for( j = 0; j < pps_num_exp_slices_in_tile[ i ]; j++ ) {
                sliceHeightInCtus[ i + j ] = pps_exp_slice_height_in_ctus_minus1[ i ][ j ] + 1
                remainingHeightInCtbsY −= sliceHeightInCtus[ i + j ]
            }
            uniformSliceHeight = sliceHeightInCtus[ i + j − 1 ]
            while( remainingHeightInCtbsY >= uniformSliceHeight ) {
                sliceHeightInCtus[ i + j ] = uniformSliceHeight
                remainingHeightInCtbsY −= uniformSliceHeight
                j++
            }
            if( remainingHeightInCtbsY > 0 ) {
                sliceHeightInCtus[ i + j ] = remainingHeightInCtbsY
                j++
            }
```

FIG. 34

```
            NumSlicesInTile[ i ] = j
        }
        ctbY = TileRowBdVal[ tileY ]
        for( j = 0; j < NumSlicesInTile[ i ]; j++ ) {
            AddCtbsToSlice( i + j, TileColBdVal[ tileX ], TileColBdVal[ tileX + 1 ],
                    ctbY, ctbY + sliceHeightInCtus[ i + j ] )
            ctbY += sliceHeightInCtus[ i + j ]
            sliceWidthInTiles[ i + j ] = 1
            sliceHeightInTiles[ i + j ] = 1
        }
        i += NumSlicesInTile[ i ] − 1
    } else
        for( j = 0; j < sliceHeightInTiles[ i ]; j++ )
            for( k = 0; k < sliceWidthInTiles[ i ]; k++ )
                AddCtbsToSlice( i, TileColBdVal[ tileX + k ], TileColBdVal[ tileX + k + 1 ],
                    TileRowBdVal[ tileY + j ], TileRowBdVal[ tileY + j + 1 ] )
    if( i < pps_num_slices_in_pic_minus1 ) {
        if( pps_tile_idx_delta_present_flag )
            tileIdx += pps_tile_idx_delta_val[ i ]
        else {
            tileIdx += sliceWidthInTiles[ i ]
            if( tileIdx % NumTileColumns = = 0 )
                tileIdx += ( sliceHeightInTiles[ i ] − 1 ) * NumTileColumns
        }
    }
}
```

IMAGE ENCODING/DECODING METHOD AND APPARATUS FOR SELECTIVELY ENCODING SIZE INFORMATION OF RECTANGULAR SLICE, AND METHOD FOR TRANSMITTING BITSTREAM

CROSS-REFERENCE TO PRIOR APPLICATIONS

This application is a Continuation of U.S. application Ser. No. 18/222,230 filed Jul. 14, 2023, now allowed, which is a Continuation of U.S. application Ser. No. 17/939,621, filed Sep. 7, 2022, now U.S. Pat. No. 11,743,469 issued Aug. 29, 2023, which is a Continuation of PCT/KR2021/002822, filed Mar. 8, 2021, which claims priority to U.S. Provisional Application No. 62/987,336 filed Mar. 9, 2020, each hereby expressly incorporated by reference in its entirety.

TECHNICAL FIELD

The present disclosure relates to an image encoding/decoding method and apparatus, and, more particularly, to an image encoding and decoding method and apparatus for selectively encoding size information of a slice, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for improving encoding/decoding efficiency by selectively encoding size information of a slice.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include acquiring size information indicating a size of a current slice corresponding to at least a portion of a current picture from a bitstream and determining the size of the current slice based on the size information. Here, the size information may include width information indicating a width of the current slice in units of tile columns and height information indicating a height of the current slice in units of tile rows, and the acquiring of the size information from the bitstream may be performed based on whether the current slice belongs to a last tile column or last tile row of the current picture.

In addition, an image decoding apparatus according to an aspect of the present disclosure may include a memory and at least one processor. The at least one processor may acquire size information indicating a size of a current slice corresponding to at least a portion of a current picture from a bitstream; and determine the size of the current slice based on the size information. Here, the size information may include width information indicating a width of the current slice in units of tile columns and height information indicating a height of the current slice in units of tile rows, and the size information may be acquired based on whether the current slice belongs to a last tile column or last tile row of the current picture.

An image encoding method performed by an image encoding apparatus according to another aspect of the present disclosure may include determining a current slice corresponding to at least one a portion of a current picture and generating a bitstream including size information of the current slice. Here, the size information may include width information indicating a width of the current slice in units of tile columns and height information indicating a height of the current slice in units of tile rows, and the generating of the bitstream including the size information of the current slice may be performed based on whether the current slice belongs to a last tile column or last tile row of the current picture.

In addition, a transmission method according to another aspect of the present disclosure may transmit the bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus for improving encoding/decoding efficiency by selectively encoding size information of a slice.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 25 is a view showing an embodiment of a syntax for a sequence parameter set.

FIG. 26 is a view showing an embodiment of a syntax of a picture parameter set.

FIGS. 30 and 31 are views showing another embodiment of a picture parameter set.

FIGS. 33 and 34 are views showing an algorithm for determining SliceTopLeftTileIdx.

MODE FOR INVENTION

Figure 1:
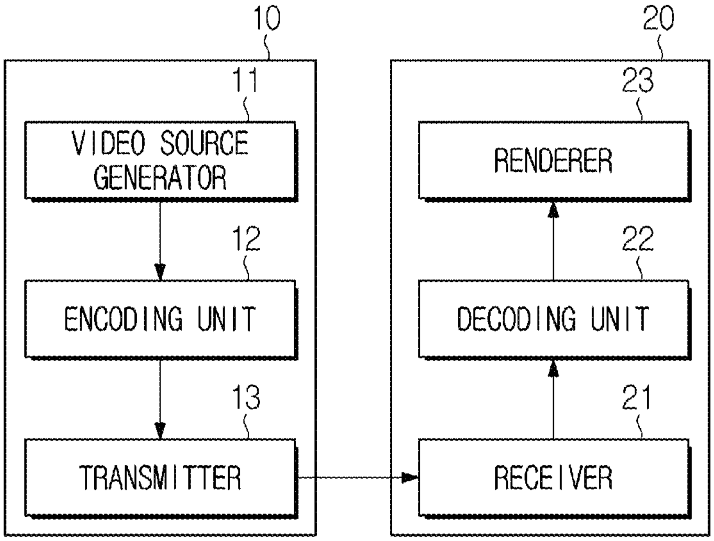
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "video" may mean a set of images over time. A picture generally refers to a unit representing one image at a specific time, and a slice/tile is a kind of a coding unit constituting a portion of a picture in coding process. One picture may be composed of one or more slices/tiles. In addition, the slice/tile may include one or more coding tree units (CTU). One picture may be composed of one or more slices/tiles. One picture may include one or more tile groups. One tile group may include one or more tiles. A brick may represent a rectangular region of CTU rows within a tile in a picture. One tile may include one or more bricks. The brick may represent a rectangular region of CTU rows in a tile. One tile may be partitioned into a plurality of bricks and each brick may include one or more CTU rows belonging to a tile. A tile which is not partitioned into a plurality of bricks may also be treated as a brick.

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma blocks (e.g., Cb and Cr). The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a source device 10 and a reception device 20.

The source device 10 may deliver encoded video and/or image information or data to the reception device 20 in the form of a file or streaming via a digital storage medium or network.

The source device 10 according to an embodiment may include a video source generator 11, an encoding device 12 and a transmitter 13. The reception device 20 according to an embodiment may include a receiver 21, a decoding device 22 and a renderer 23. The encoding device 12 may be called a video/image encoding device, and the decoding device 22 may be called a video/image decoding device. The transmitter 13 may be included in the encoding device 12. The receiver 21 may be included in the decoding device 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding device 12 may encode an input video/image. The encoding device 12 may perform a series of procedures such as prediction, transform, and quantization for compression and coding efficiency. The encoding device 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding device 22.

The decoding device 22 may decode the video/image by performing a series of procedures such as dequantization, inverse transform, and prediction corresponding to the operation of the encoding device 12.

The renderer 23 may render the decoded video/image. The rendered video/image may be displayed through the display.

Overview of Image Encoding Apparatus

Figure 2:
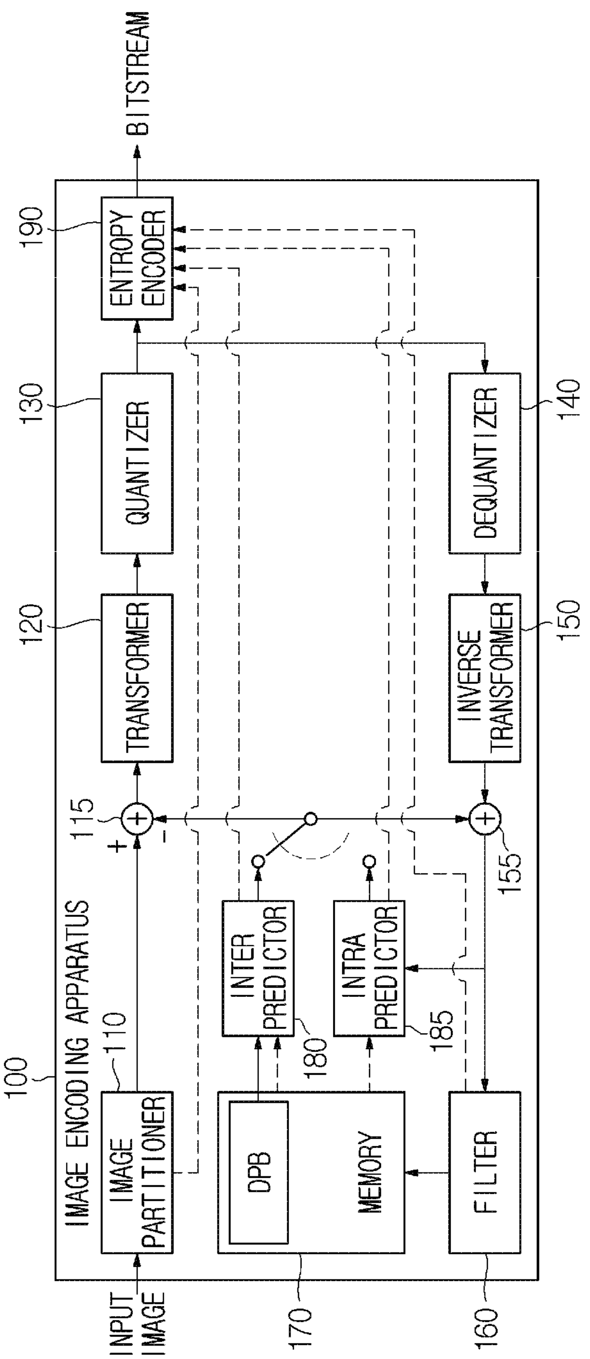
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image source device 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image source device 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image source device 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image source device 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image source device 100, prediction mismatch between the image source device 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
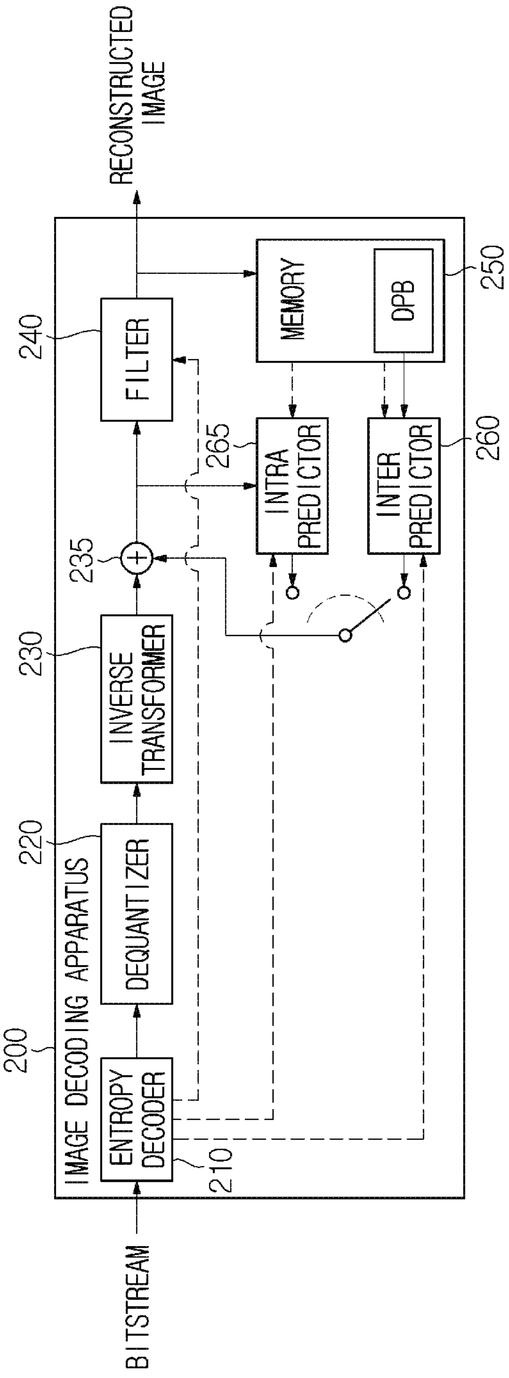
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image reception device 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image reception device 200 may be configured by a hardware component (e.g., a decoder or a processor) according to an embodiment. In addition, the memory 250 may include a decoded picture buffer (DPB) or may be configured by a digital storage medium.

The image reception device 200, which has received a bitstream including video/image information, may reconstruct an image by performing a process corresponding to a process performed by the image source device 100 of FIG. 2. For example, the image reception device 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image reception device 200 may be reproduced through a reproducing apparatus (not shown).

The image reception device 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image reception device 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image source device 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image source device 100 may be equally or correspondingly applied to the filter 240, the inter predictor 260, and the intra predictor 265 of the image reception device 200.

Overview of Image Partitioning

The video/image coding method according to the present disclosure may be performed based on an image partitioning structure as follows. Specifically, the procedures of prediction, residual processing ((inverse) transform, (de) quantization, etc.), syntax element coding, and filtering, which will be described later, may be performed based on a CTU, CU (and/or TU, PU) derived based on the image partitioning structure. The image may be partitioned in block units and the block partitioning procedure may be performed in the image partitioner 110 of the encoding apparatus. The partitioning related information may be encoded by the entropy encoder 190 and transmitted to the decoding apparatus in the form of a bitstream. The entropy decoder 210 of the decoding apparatus may derive a block partitioning structure of the current picture based on the partitioning related information obtained from the bitstream, and based on this, may perform a series of procedures (e.g., prediction, residual processing, block/picture reconstruction, in-loop filtering, etc.) for image decoding.

Figure 4:
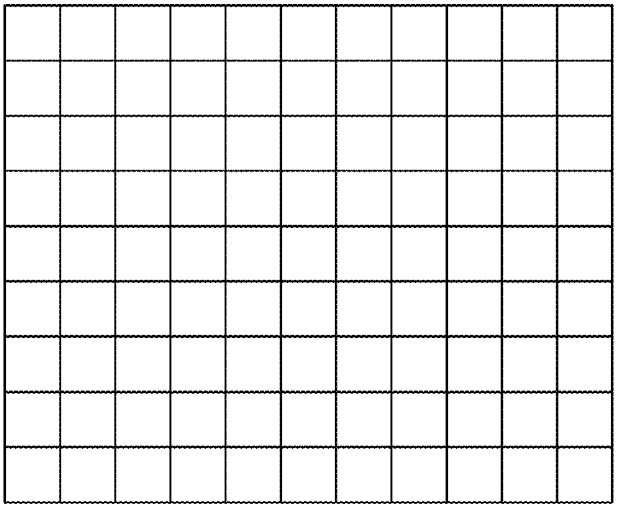
FIG. 4 is a view showing a partitioning structure of an image according to an embodiment.

Pictures may be partitioned into a sequence of coding tree units (CTUs). FIG. 4 shows an example in which a picture is partitioned into CTUs. The CTU may correspond to a coding tree block (CTB). Alternatively, the CTU may include a coding tree block of luma samples and two coding tree blocks of corresponding chroma samples. For example, for a picture that contains three sample arrays, the CTU may include an N×N block of luma samples and two corresponding blocks of chroma samples. A maximum allowable size of a CTU for coding and prediction may be different from a maximum allowable size of a CTU for transform. For example, a maximum allowable size of a luma block in a CTU may be 128×128 even if the maximum size of luma transform blocks is 64×64.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structures, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

Figure 5:
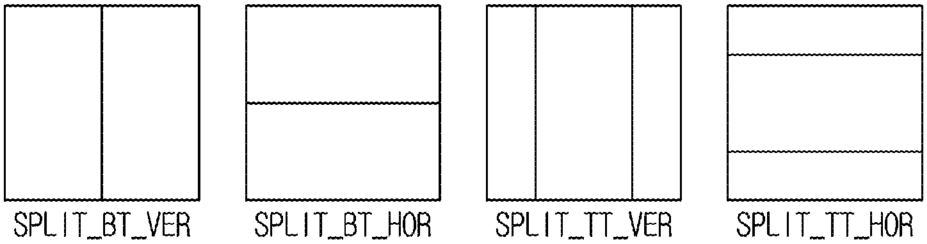
FIG. 5 is a view showing an embodiment of a partitioning type of a block according to a multi-type tree structure.

FIG. 5 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 5, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 5, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 5, by horizontal ternary splitting, two CUs having a height which is ¼ of the height of the current CU and having the same width as the current CU and a CU having a height which is half the height of the current CU and having the same width as the current CU may be generated.

Figure 6:
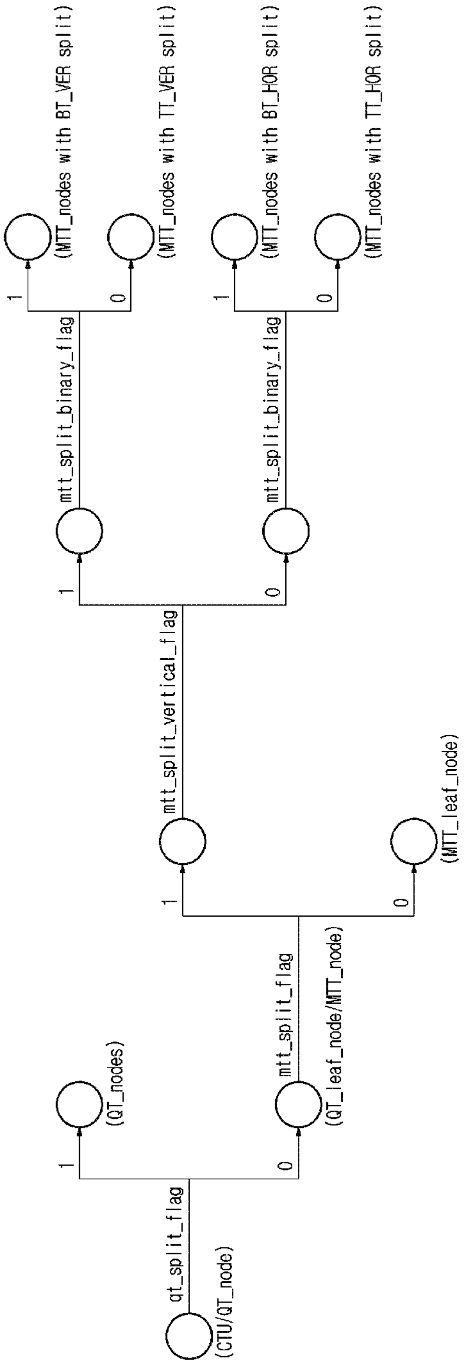
FIG. 6 is a view showing a signaling mechanism of block splitting information in a quadtree with nested multi-type tree structure according to the present disclosure.

FIG. 6 is a view showing a signaling mechanism of block splitting information in a quadtree with nested multi-type tree structure according to the present disclosure.

Here, the CTU is treated as the root node of the quadtree, and is partitioned for the first time into a quadtree structure. Information (e.g., qt_split_flag) indicating whether quadtree splitting is performed with respect to the current CU (CTU or node (QT_node) of the quadtree) may be signaled. For example, when qt_split_flag has a first value (e.g., “1”), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) may be signaled to indicate whether the current node is additionally partitioned. If the corresponding node is additionally partitioned (e.g., if the first flag is 1), a second flag (e.g., Mtt_split_cu_vertical_flag) may be signaled to indicate the splitting direction. For example, the splitting direction may be a vertical direction if the second flag is 1 and may be a horizontal direction if the second flag is 0. Then, a third flag (e.g., Mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below. In the following description, the multi-type tree splitting mode may be referred to as a multi-tree splitting type or splitting type.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 7:
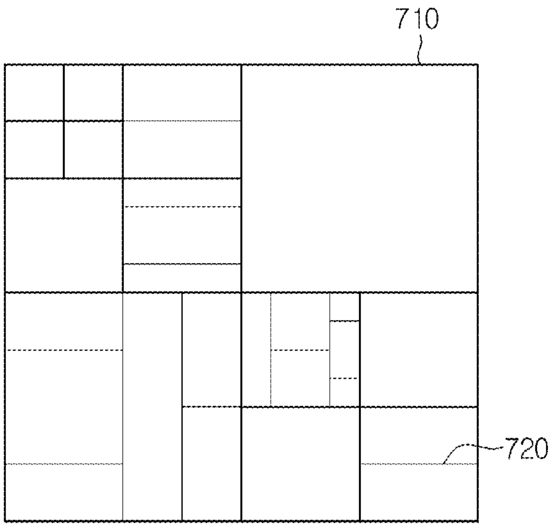
FIG. 7 is a view showing an embodiment in which a CTU is partitioned into multiple CUs.

FIG. 7 is a view showing an example in which a CTU is partitioned into multiple CUs by applying a multi-type tree after applying a quadtree. In FIG. 7, bold block edges 710 represent quadtree partitioning and the remaining edges 720 represent multitype tree partitioning. The CU may correspond to a coding block (CB). In an embodiment, the CU may include a coding block of luma samples and two coding blocks of chroma samples corresponding to the luma samples. A chroma component (sample) CB or TB size may be derived based on a luma component (sample) CB or TB size according to the component ratio according to the color format (chroma format, e.g., 4:4:4, 4:2:2, 4:2:0 or the like) of the picture/image. In case of 4:4:4 color format, the chroma component CB/TB size may be set equal to be luma component CB/TB size. In case of 4:2:2 color format, the width of the chroma component CB/TB may be set to half the width of the luma component CB/TB and the height of the chroma component CB/TB may be set to the height of the luma component CB/TB. In case of 4:2:0 color format, the width of the chroma component CB/TB may be set to half the width of the luma component CB/TB and the height of the chroma component CB/TB may be set to half the height of the luma component CB/TB.

In an embodiment, when the size of the CTU is 128 based on the luma sample unit, the size of the CU may have a size from 128×128 to 4×4 which is the same size as the CTU. In one embodiment, in case of 4:2:0 color format (or chroma format), a chroma CB size may have a size from 64×64 to 2×2.

Meanwhile, in an embodiment, the CU size and the TU size may be the same. Alternatively, there may be a plurality of TUs in a CU region. The TU size generally may represent a luma component (sample) transform block (TB) size.

The TU size may be derived based a largest allowable TB size maxTbSize which is a predetermined value. For example, when the CU size is greater than maxTbSize, a plurality of TUs (TBs) having maxTbSize may be derived from the CU and transform/inverse transform may be performed in units of TU (TB). For example, the largest allowable luma TB size may be 64×64 and the largest allowable chroma TB size may be 32×32. If the width or height of the CB partitioned according to the tree structure is larger than the largest transform width or height, the CB may be automatically (or implicitly) partitioned until the TB size limit in the horizontal and vertical directions is satisfied.

In addition, for example, when intra prediction is applied, an intra prediction mode/type may be derived in units of CU (or CB) and a neighboring reference sample derivation and prediction sample generation procedure may be performed in units of TU (or TB). In this case, there may be one or a plurality of TUs (or TBs) in one CU (or CB) region and, in this case, the plurality of TUs or (TBs) may share the same intra prediction mode/type.

Meanwhile, for a quadtree coding tree scheme with nested multitype tree, the following parameters may be signaled as SPS syntax elements from the encoding apparatus to the decoding apparatus. For example, at least one of a CTU size which is a parameter representing the root node size of a quadtree, MinQTSize which is a parameter representing the minimum allowed quadtree leaf node size, MaxBtSize which is a parameter representing the maximum allowed binary tree root node size, MaxTtSize which is a parameter representing the maximum allowed ternary tree root node size, MaxMttDepth which is a parameter representing the maximum allowed hierarchy depth of multi-type tree splitting from a quadtree leaf node, MinBtSize which is a parameter representing the minimum allowed binary tree leaf node size, or MinTtSize which is a parameter representing the minimum allowed ternary tree leaf node size may be signaled.

As an embodiment of using 4:2:0 chroma format, the CTU size may be set to 128×128 luma blocks and two 64×64 chroma blocks corresponding to the luma blocks. In this case, MinOTSize may be set to 16×16, MaxBtSize may be set to 128×128, MaxTtSzie may be set to 64×64, MinBtSize and MinTtSize may be set to 4×4, and MaxMttDepth may be set to 4. Quadtree partitioning may be applied to the CTU to generate quadtree leaf nodes. The quadtree leaf node may be called a leaf QT node. Quadtree leaf nodes may have a size from a 16×16 size (e.g., the MinOTSize) to a 128×128 size (e.g., the CTU size). If the leaf QT node is 128×128, it may not be additionally partitioned into a binary tree/ternary tree. This is because, in this case, even if partitioned, it exceeds MaxBtsize and MaxTtszie (e.g., 64×64). In other cases, leaf QT nodes may be further partitioned into a multitype tree. Therefore, the leaf QT node is the root node for the multitype tree, and the leaf QT node may have a multitype tree depth (mttDepth) 0 value. If the multitype tree depth reaches MaxMttdepth (e.g., 4), further partitioning may not be considered further. If the width of the multitype tree node is equal to MinBtSize and less than or equal to 2×MinTtSize, then no further horizontal partitioning may be considered. If the height of the multitype tree node is equal to MinBtSize and less than or equal to 2×MinTtSize, no further vertical partitioning may be considered. When partitioning is not considered, the encoding apparatus may skip signaling of partitioning information. In this case, the decoding apparatus may derive partitioning information with a predetermined value.

Meanwhile, one CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure may be represented as SINGLE TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, this means that a CU in an I slice/tile group, to which the separate block tree structure is applied, may include a coding block of luma components or coding blocks of two chroma components and a CU of a P or B slice/tile group may include blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

The quadtree coding block structure with the multi-type tree may provide a very flexible block partitioning structure. Because of the partition types supported in a multi-type tree, different partition patterns may potentially result in the same coding block structure in some cases. In the encoding apparatus and the decoding apparatus, by limiting the occurrence of such redundant partition patterns, a data amount of partitioning information may be reduced.

In addition, in encoding and decoding of a video/image according to the present disclosure, an image processing unit may have a hierarchical structure. One picture may be divided into one or more tiles, bricks, slices and/or tile groups. One slice may include one or more bricks. One brick may include one or more CTU rows in a tile. A slice may include an integer number of bricks of a picture. One tile group may include one or more tiles. One tile may include one or more CTUs. A CTU may be divided into one or more CUs. A tile may be a rectangular region including a specific tile row and a specific tile column composed of a plurality of CTUs in a picture. A tile group may include an integer number of tiles according to tile raster scan in a picture. A slice header may carry information/parameters applicable to a corresponding slice (blocks in a slice). When an encoding apparatus or a decoding apparatus has a multi-core processor, an encoding/decoding procedure for the tile, the slice, the brick and/or the tile group may be performed in parallel.

In the present disclosure, the names or concepts of the slice or the tile group may be used interchangeably. That is, a tile group header may be referred to as a slice header. Here, a slice may have one of slice types including an intra (I) slice, a predictive (P) slice and a bi-predictive (B) slice. For blocks in an I slice, inter prediction is not used for prediction and only intra prediction may be used. Of course, even in this case, an original sample value may be coded and signaled without prediction. For blocks in a P slice, intra prediction or inter prediction may be used. When inter prediction is used, only uni-prediction may be used. Meanwhile, for blocks in a B slice, intra prediction or inter prediction may be used. When inter prediction is used, up to bi-prediction may be used.

The encoding apparatus may determine tile/tile group, brick, slice and maximum and minimum coding unit size according to the characteristics (e.g., resolution) of a video image or in consideration of coding efficiency and parallel processing. In addition, information on this or information capable of deriving this may be included in a bitstream.

The decoding apparatus may acquire information indicating whether a tile/tile group, a brick or a slice of a current picture or a CTU in a tile is partitioned into a plurality of coding units. The encoding apparatus and the decoding apparatus may increase encoding efficiency, by signaling such information under specific conditions.

The slice header (slice header syntax) may include information/parameters that may be commonly applied to the slice. The APS (APS syntax) or PPS (PPS syntax) may include information/parameters that may be commonly applied to one or more pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters associated with combination of coded video sequence (CVS).

In addition, for example, information on partitioning and configuration of the tile/tile group/brick/slice may be constructed at an encoding stage through the high level syntax and transmitted to the decoding apparatus in the form of a bitstream.

Overview of Intra Prediction

Hereinafter, intra prediction performed by the encoding and decoding apparatus described above will be described in greater detail. Intra prediction may represent prediction for generating prediction samples for a current block based on reference samples in a picture to which a current block belongs (hereinafter referred to as a current picture).

Figure 8:
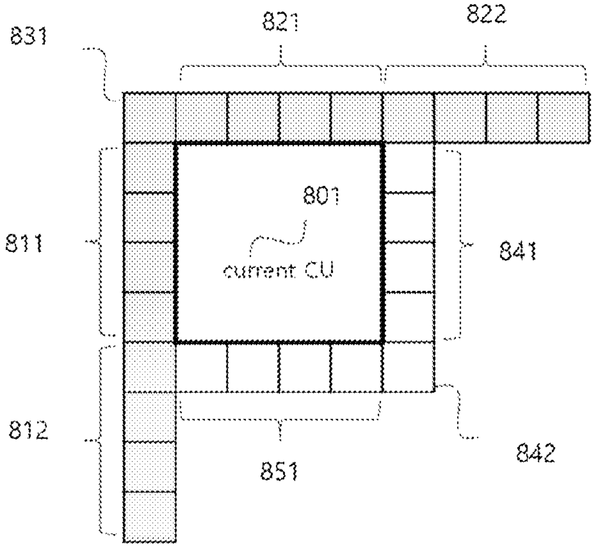
FIG. 8 is a view showing neighboring reference samples according to an embodiment.
Figure 9:
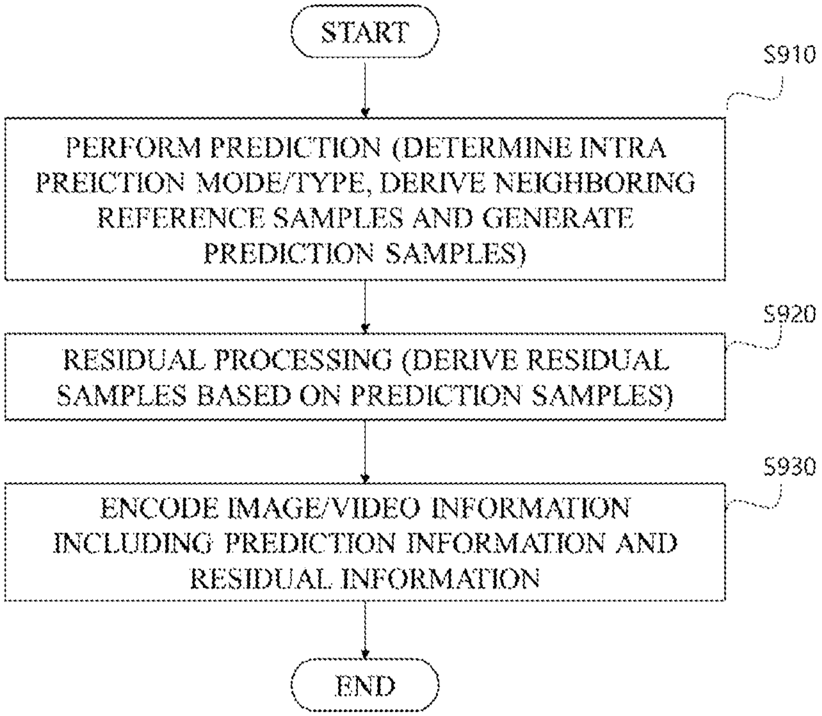
FIGS. 9 to 10 are views illustrating intra prediction according to an embodiment.
Figure 10:
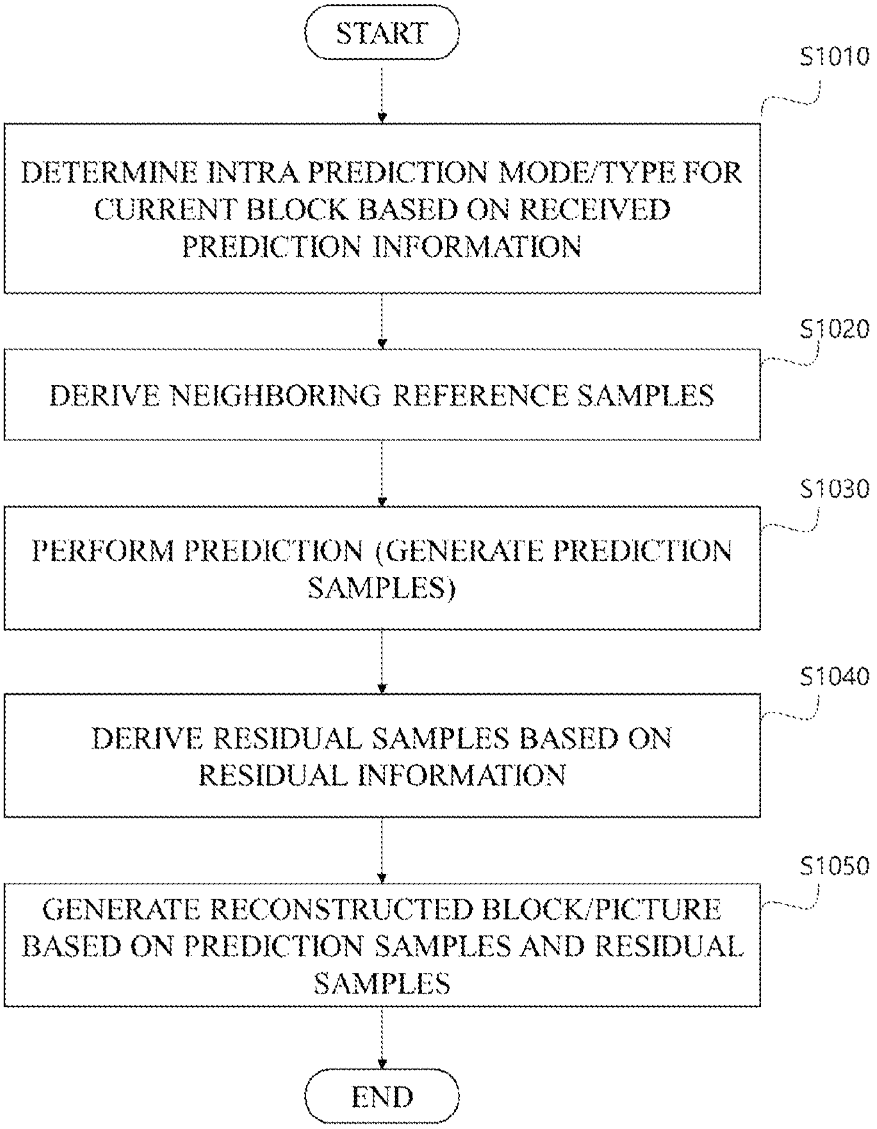

A description will be given with reference to FIG. 8. When intra prediction is applied to a current block 801, neighboring reference samples to be used for intra prediction of the current block 801 may be derived. The neighboring reference samples of the current block may include a total of 2×nh samples including samples 811 adjacent to a left boundary of the current block having a size of nW×nH and samples 812 adjacent to a bottom-left, a total of 2×nW samples including samples 821 adjacent to a top boundary of the current block and samples 822 adjacent to a top-right, and one sample 831 adjacent to a top-left of the current block. Alternatively, the neighboring reference samples of the current block may include a plurality of columns of top neighboring samples and a plurality of rows of left neighboring samples.

In addition, the neighboring reference samples of the current block may include a total of nH samples 841 adjacent to a right boundary of the current block having a size of nW×nH, a total of nW samples 851 adjacent to a bottom boundary of the current block and one sample 842 adjacent to a bottom-right of the current block.

However, some of the neighboring reference samples of the current block have not yet been decoded or may not be available. In this case, the decoding apparatus may construct neighboring reference samples to be used for prediction by substituting unavailable samples with available samples. Alternatively, neighboring reference samples to be used for prediction may be constructed through interpolation of available samples.

When neighboring reference samples are derived, (i) a prediction sample may be derived based on an average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode. In addition, the prediction sample may be generated through interpolation between a first neighboring sample and a second neighboring sample located in a direction opposite to a prediction direction of an intra prediction mode of the current block based on the prediction sample of the current block among the neighboring reference samples. The above-described case may be referred to as a linear interpolation intra prediction (LIP). In addition, chroma prediction samples may be generated based on luma samples using a linear model. This case may be called an LM mode. In addition, a temporary prediction sample of the current block may be derived based on filtered neighboring reference samples, and the prediction sample of the current block may be derived by weighted-summing the temporary prediction sample and at least one reference sample derived according to the intra prediction mode among existing neighboring reference samples, that is, unfiltered neighboring reference samples. The above-described case may be called position dependent intra prediction (PDPC). In addition, a reference sample line with highest prediction accuracy may be selected from among multiple neighboring reference sample lines of the current block and the prediction sample may be derived using a reference sample located in a prediction direction on a corresponding line. At this time, intra prediction encoding may be performed by instructing (signaling) a used reference sample line to the decoding apparatus. The above-described case may be called multi-reference line (MRL) intra prediction or MRL based intra prediction. In addition, the current block may be partitioned into vertical or horizontal subpartitions, intra prediction may be performed based on the same intra prediction mode, and neighboring reference samples may be derived and used in units of subpartitions. That is, in this case, the intra prediction mode for the current block is equally applied to the subpartitions, and neighboring reference samples may be derived and used in units of subpartitions, thereby increasing intra prediction performance in some cases. Such a prediction method may be called intra sub-partitions (ISP) or ISP based intra prediction. Such intra prediction methods may be called an intra prediction type, in order to be distinguished from an intra prediction mode (e.g., DC mode, Planar mode or directional mode). The intra prediction type may be called various terms such as an intra prediction technique or an additional intra prediction mode. For example, the intra prediction type (or the additional intra prediction mode, etc.) may include at least one of the above-described LIP, PDPC, MRL, and ISP. A normal intra prediction method excluding specific intra prediction types such as LIP, PDPC, MRL and ISP may be called a normal intra prediction type. The normal intra prediction type may refer to a case where the specific intra prediction type is not applied, and prediction may be performed based on the above-described intra prediction mode. Meanwhile, post-filtering may be performed with respect to the derived prediction sample as necessary.

Specifically, an intra prediction procedure may include an intra prediction mode/type determination step, a neighboring reference sample derivation step and an intra prediction mode/type based prediction sample derivation step. In addition, post-filtering may be performed with respect to the derived prediction sample as necessary.

Meanwhile, in addition to the above-described intra prediction types, affine linear weighted intra prediction (ALWIP) may be used. ALWIP may be called linear weighted intra prediction (LWIP), matrix weighted intra prediction (MIP) or matrix based intra prediction. When MIP is applied to the current block, i) using neighboring reference samples subjected to an averaging procedure, ii) a matrix-vector-multiplication procedure may be performed and iii) a horizontal/vertical interpolation procedure may be further performed as necessary, thereby deriving the prediction samples for the current block. Intra prediction modes used for MIP may be constructed differently from intra prediction modes used in the above-described LIP, PDPC, MRL, ISP intra prediction or normal intra prediction. The intra prediction mode for MIP may be called a MIP intra prediction mode, a MIP prediction mode or a MIP mode. For example, a matrix and offset used in matrix-vector-multiplication may be differently set according to the intra prediction mode for MIP. Here, the matrix may be referred to as a (MIP) weight matrix, and the offset may be referred to as a (MIP) offset vector or a (MIP) bias vector. A detailed MIP method will be described below.

A block reconstruction procedure based on intra prediction and an intra prediction unit in the encoding apparatus may schematically include, for example, the following.

S910 may be performed by the intra predictor 185 of the encoding apparatus, and S920 may be performed by a residual processor including at least one of the subtractor 115, the transformer 120, the quantizer 130, the dequantizer 140 and the inverse transformer 150 of the encoding apparatus. Specifically, S920 may be performed by the subtractor 115 of the encoding apparatus. In S930, prediction information may be derived by the intra predictor 185, and may be encoded by the entropy encoder 190. In S930, residual information may be derived by a residual processor, and may be encoded by the entropy encoder 190. The residual information is information on residual samples. The residual information may include information on quantized transform coefficients for the residual samples. As described above, the residual samples may be derived as transform coefficients through the transformer 120 of the encoding apparatus, and the transform coefficients may be derived as quantized transform coefficients through the quantizer 130. Information on the quantized transform coefficients may be encoded by the entropy encoder 190 through a residual coding procedure.

The encoding apparatus may perform intra prediction with respect to the current block (S910). The encoding apparatus may derive an intra prediction mode/type for the current block, derive neighboring reference samples of the current block, and generate prediction samples in the current block based on the intra prediction mode/type and the neighboring reference samples. Here, a procedure for determining an intra prediction mode/type, a procedure for deriving neighboring reference samples and a procedure for generating prediction samples may be simultaneously performed, or any one procedure may be performed before another procedure. For example, although not shown, the intra predictor 185 of the encoding apparatus may include an intra prediction mode/type determination unit, a reference sample derivation unit, a prediction sample derivation unit. The intra prediction mode/type determination unit may determine the intra prediction mode/type for the current block, the reference sample derivation unit may derive neighboring reference samples of the current block, and the prediction sample derivation unit may derive the prediction samples of the current block. Meanwhile, when the below-described prediction sample filtering procedure is performed, the intra predictor 185 may further include a prediction sample filter. The encoding apparatus may determine a mode/type applied to the current block from among a plurality of intra prediction modes/types. The encoding apparatus may compare RD costs of the intra prediction modes/types and determine an optimal intra prediction mode/type for the current block.

Meanwhile, the encoding apparatus may perform a prediction sample filtering procedure. Prediction sample filtering may be referred to as post-filtering. Some or all of the prediction samples may be filtered by the prediction sample filtering procedure. In some cases, the prediction sample filtering procedure may be omitted.

The encoding apparatus may generate residual samples for the current block based on (filtered) prediction samples (S920). The encoding apparatus may compare the prediction samples from the original samples of the current block based on a phase and derive the residual samples.

The encoding apparatus may encode image information including information on intra prediction (prediction information) and residual information of the residual samples (S930). The prediction information may include the intra prediction mode information and the intra prediction type information. The encoding apparatus may output encoded image information in the form of a bitstream. The output bitstream may be transmitted to the decoding apparatus through a storage medium or a network.

The residual information may include a residual coding syntax described below. The encoding apparatus may transform/quantize the residual samples to derive quantized transform coefficients. The residual information may include information on the quantized transform coefficients.

Meanwhile, as described above, the encoding apparatus may generate a reconstructed picture (including reconstructed samples and a reconstructed block). To this end, the encoding apparatus may perform dequantization/inverse transform with respect to the quantized transform coefficients again to derive (modified) residual samples. The residual samples are transformed/quantized and then dequantized/inversely transformed in order to derive the same residual samples as the residual samples derived in the decoding apparatus as described above. The encoding apparatus may generate a reconstructed block including the reconstructed samples for the current block based on the prediction samples and the (modified) residual samples. A reconstructed picture for the current picture may be generated based on the reconstructed block. As described above, an in-loop filtering procedure is further applicable to the reconstructed picture.

The video/image decoding procedure based on intra prediction and the intra predictor in the decoding apparatus may schematically include the following, for example. The decoding apparatus may perform operation corresponding to operation performed in the encoding apparatus.

S1010 to S1030 may be performed by the intra predictor 265 of the decoding apparatus, and the prediction information of S1010 and the residual information of S1040 may be acquired from the bitstream by the entropy decoder 210 of the decoding apparatus. The residual processor including at least one of the dequantizer 220 and the inverse transformer 230 of the decoding apparatus may derive the residual samples for the current block based on the residual information. Specifically, the dequantizer 220 of the residual processor may perform dequantization based on quantized transform coefficients derived based on the residual information to derive transform coefficients and the dequantizer 220 of the residual processor may perform inverse transform with respect to the transform coefficients to derive the residual samples for the current block. S1050 may be performed by the adder 235 or the reconstructor of the decoding apparatus.

Specifically, the decoding apparatus may derive a intra prediction mode/type for the current block based on the received prediction information (intra prediction mode/type information) (S1010). The decoding apparatus may derive neighboring reference samples of the current block (S1020). The decoding apparatus may generate prediction samples in the current blocks based on the intra prediction mode/type and the neighboring reference samples (S1030). In this case, the decoding apparatus may perform a prediction sample filtering procedure. Prediction sample filtering may be referred to as post-filtering. Some or all of the prediction samples may be filtered by the prediction sample filtering procedure. In some cases, the prediction sample filtering procedure may be omitted.

The decoding apparatus may generate residual samples for the current block based on the received residual information. The decoding apparatus may generate reconstructed samples for the current block based on the prediction samples and the residual samples, and derive a reconstruction sample including the reconstructed samples (S1040). A reconstructed picture for the current picture may be generated based on the reconstructed block. As described above, the in-loop filtering procedure is further applicable to the reconstructed picture.

Here, although not shown, the intra predictor 265 of the decoding apparatus may include an intra prediction mode/type determination unit, a reference sample derivation unit and a prediction sample derivation unit, the intra prediction mode/type determination unit may determine the intra prediction mode/type for the current block based on the intra prediction mode/type information acquired by the entropy decoder 210, the reference sample derivation unit may derive the neighboring reference samples of the current block, and the prediction sample derivation unit may derive the prediction samples of the current block. Meanwhile, when the above-described prediction sample filtering procedure is performed, the intra predictor 265 may further include a prediction sample filter.

The intra prediction mode information may include flag information (e.g., intra_luma_mpm_flag) indicating whether a most probable mode (MPM) or a remaining mode is applied to the current block, and, when the MPM is applied to the current block, the prediction mode information may further include index information (e.g., intra_luma_mpm_idx) indicating one of intra prediction mode candidates (MPM candidates). The intra prediction mode candidates (MPM candidates) may be configured as an MPM candidate list or an MPM list. In addition, when the MPM is not applied to the current block, the intra prediction mode information may further include remaining mode information (e.g., intra_luma_mpm_remainder) indicating one of the remaining intra prediction modes excluding the intra prediction mode candidates (MPM candidates). The decoding apparatus may determine the intra prediction mode of the current block based on the intra prediction mode information. A separate MPM list may be configured for the above-described MIP.

In addition, the intra prediction type information may be implemented in various forms. For example, the intra prediction type information may include intra prediction type index information indicating one of the intra prediction types. As another example, the intra prediction type information may include at least one of reference sample line information (e.g., intra_luma_ref_idx)) indicating whether the MRL is applied to the current block and what numberth reference sample line is used if applied, ISP flag information (e.g., intra_subpartitions_mode_flag) indicating whether the ISP is applied to the current block, ISP type information (e.g., intra_subpartitions_split_flag) indicating the split type of subpartitions when the ISP is applied, flag information indicating whether PDCP is applied or flag information indicating whether LIP is applied. In addition, the intra prediction type information may include an MIP flag indicating whether MIP is applied to the current block.

The intra prediction mode information and/or the intra prediction type information may be encoded/decoded through the coding method described in the present disclosure. For example, the intra prediction mode information and/or the intra prediction type information may be encoded/decoded through entropy coding (e.g., CABAC or CAVLC) based on truncated (rice) binary code.

Overview of Inter Prediction

Hereinafter, detailed technology of the inter prediction in the description of encoding and decoding with reference to FIGS. 2 and 3 will be described. In the case of the decoding apparatus, the inter prediction based video/image decoding method and the inter predictor in the decoding apparatus may operate according to the following description. In the case of the encoding apparatus, the inter prediction based video/image encoding method and the inter predictor in the encoding apparatus may operate according to the following description. In addition, in the following description, data encoded by the following description may be stored in the form of a bitstream.

The predictor of the encoding/decoding apparatus may perform inter prediction in units of blocks to derive a prediction sample. Inter prediction may represent prediction derived by a method dependent on data elements (e.g., sample values, motion information, etc.) of picture(s) other than the current picture. When inter prediction is applied to the current block, a predicted block (prediction sample array) for the current block may be derived based on a reference block (reference sample array) specified by a motion vector on a reference picture indicated by a reference picture index. In this case, in order to reduce the amount of motion information transmitted in the inter prediction mode, the motion information of the current block may be predicted in units of blocks, subblocks or samples based on correlation of motion information between a neighboring block and a current block. The motion information may include a motion vector and a reference picture index. The motion information may further include inter prediction type (L0 prediction, L1 prediction, Bi prediction, etc.) information. When inter prediction is applied, neighboring blocks may include a spatial neighboring block located in the current picture and a temporal neighboring block located in the reference picture. The reference picture including the reference block and the reference picture including the temporal neighboring block may be the same or different. The temporal neighboring block may be referred to as a collocated reference block or a collocated CU or colCU, and the reference picture including the temporal neighboring block may be referred to as a collocated picture (colPic). For example, a motion information candidate list may be configured based on the neighboring blocks of the current block, and flag or index information indicating which candidate is selected (used) to derive the motion vector of the current block and/or a reference picture index may be signaled. Inter prediction may be performed based on various prediction modes, and, for example, in the case of a skip mode and a merge mode, motion information of the current block may be equal to motion information of a selected neighboring block. In the case of the skip mode, unlike the merge mode, a residual signal may not be transmitted. In the case of motion information prediction (motion vector prediction, MVP) mode, the motion vector of the selected neighboring block may be used as a motion vector predictor, and a motion vector difference may be signaled. In this case, the motion vector of the current block may be derived using a sum of the motion vector predictor and the motion vector difference.

The motion information may include L0 motion information and/or L1 motion information according to the inter prediction type (L0 prediction, L1 prediction, Bi prediction, etc.). A motion vector in an L0 direction may be referred to as an L0 motion vector or MVL0, and a motion vector in an L1 direction may be referred to as an L1 motion vector or MVL1. Prediction based on an L0 motion vector may be referred to as L0 prediction, prediction based on an L1 motion vector may be referred to as L1 prediction, and prediction based on both the L0 motion vector and the L1 motion vector may be referred to as Bi prediction. Here, the L0 motion vector may represent a motion vector associated with reference picture list L0 (L0), and the L1 motion vector may represent a motion vector associated with reference picture list L1 (L1). Reference picture list L0 may include pictures before the current picture in an output order as reference pictures, and reference picture list L1 may include pictures after the current picture in an output order. The pictures before the current block may be referred to as forward (reference) pictures and the pictures after the current block may be referred to backward (reference) pictures. Reference picture list L0 may further include pictures after the current picture in an output order as reference pictures. In this case, in reference picture list L0, the pictures before the current block are first indexed and then the pictures after the current block are indexed. Reference picture list L1 may further include pictures before the current picture in an output order as reference pictures. In this case, in reference picture list 1, the pictures after the current block may be first indexed and then the pictures before the current block may be indexed. Here, the output order may correspond to a picture order count (POC) order.

Figure 11:
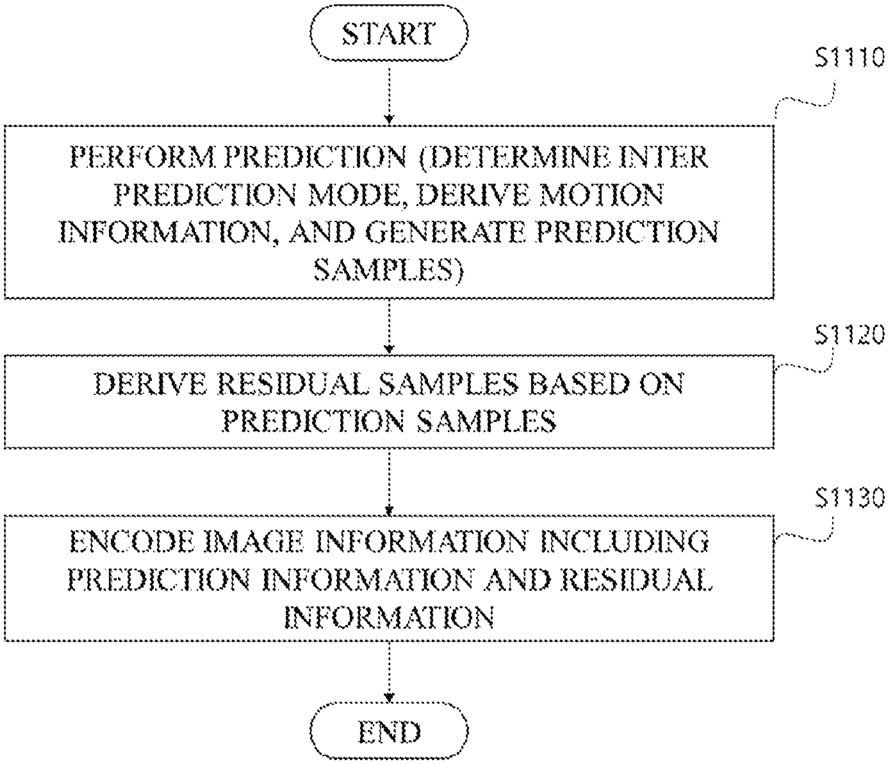
FIG. 11 is a view illustrating an encoding method using inter prediction according to an embodiment.
Figure 12:
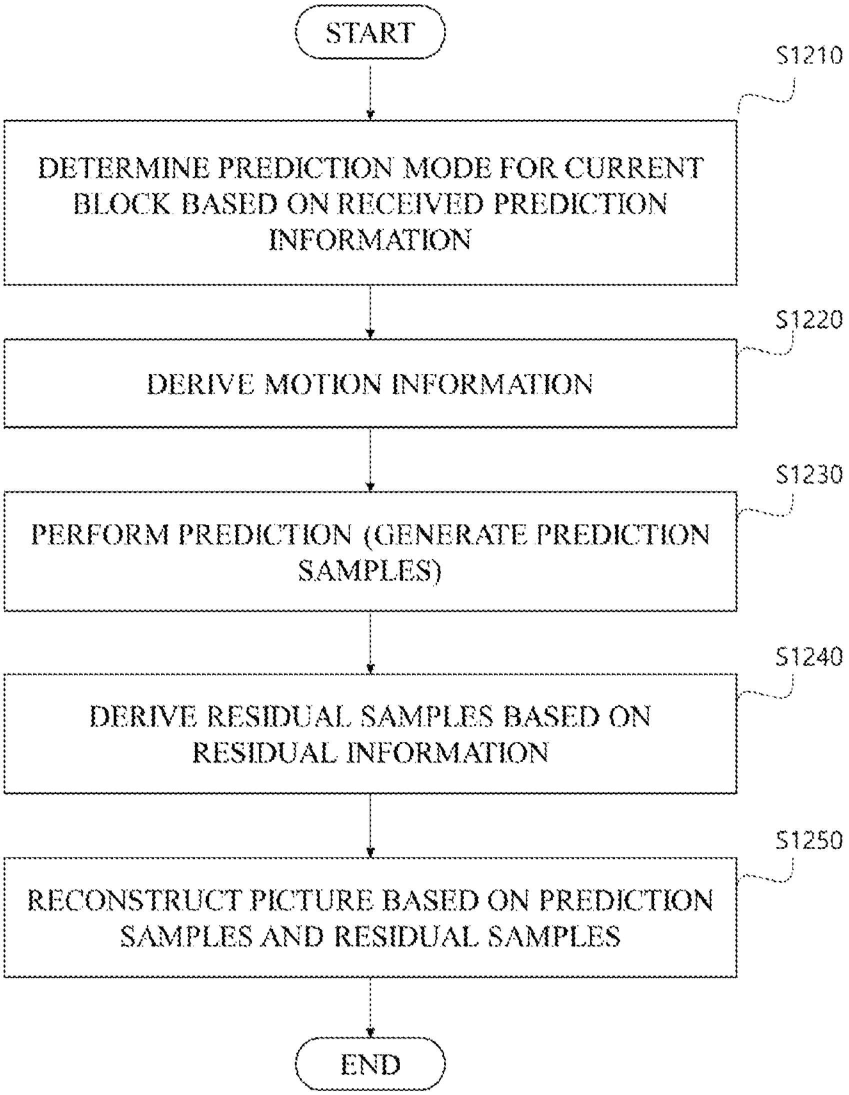
FIG. 12 is a view illustrating a decoding method using inter prediction according to an embodiment.

A video/image encoding procedure based on inter prediction and an inter predictor in the encoding apparatus may schematically the following, for example. A description will be given with reference to FIG. 11. The encoding apparatus performs inter prediction with respect to a current block (S1110). The encoding apparatus may derive an inter prediction mode and motion information of the current block, and generate prediction samples of the current block. Here, the inter prediction mode determination, motion information derivation and prediction sample derivation procedures may be simultaneously performed and any procedure may be performed before another procedure. For example, the inter predictor of the encoding apparatus may include a prediction mode determination unit, a motion information derivation unit and a prediction sample derivation unit, the prediction mode determination unit may determine a prediction mode for the current block, the motion information derivation unit may derive motion information of the current block, and the prediction sample derivation unit may derive prediction samples of the current block. For example, the inter predictor of the encoding apparatus may search for a block similar to the current block within a certain region (search region) of reference pictures through motion estimation and derive a reference block whose difference from the current block is a minimum or is less than or equal to a certain criterion. Based on this, a reference picture index indicating a reference picture in which the reference block is located may be derived, and a motion vector may be derived based on a difference in position between the reference block and the current block. The encoding apparatus may determine a mode applied to the current block among various prediction modes. The encoding apparatus may compare RD costs for the various prediction modes and determine an optimal prediction mode for the current block.

For example, the encoding apparatus may construct a merge candidate list, which will be described below, when the skip mode or the merge mode is applied to the current block, and derive a reference block whose difference from the current block is a minimum or is less than or equal to a certain criterion among the reference blocks indicated by merge candidates included in the merge candidate list. In this case, a merge candidate associated with the derived reference block may be selected, and merge index information indicating the selected merge candidate may be generated and signaled to the decoding apparatus. Motion information of the current block may be derived using motion information of the selected merge candidate.

As another example, the encoding apparatus may construct a (A) MVP candidate list, which will be described below, when a (A) MVP mode is applied to the current block, and use a motion vector of a motion vector predictor (mvp) candidate selected from among mvp candidates included in the (A) MVP candidate list as an mvp of the current block. In this case, a motion vector indicating a reference block derived by the motion estimation may be used as the motion vector of the current block, and an mvp candidate having a motion vector whose difference from the motion vector of the current block is smallest among the mvp candidates may be the selected mvp candidate. A motion vector difference (MVD) obtained by subtracting the mvp from the motion vector of the current block may be derived. In this case, information on the MVD may be signaled to the decoding apparatus. In addition, when the (A) MVP mode is applied, the value of the reference picture index may be constructed as reference picture index information and signaled to the decoding apparatus.

The encoding apparatus may derive residual samples based on the prediction samples (S1120). The encoding apparatus may derive the residual samples through comparison between the original samples of the current block and the prediction samples.

The encoding apparatus encodes image information including prediction information and residual information (S1130). The encoding apparatus may output the encoded image information in the form of a bitstream. The prediction information may include prediction mode information (e.g., skip flag, merge flag, mode index, etc.) and motion information as information related to the prediction procedure. The motion information may include candidate selection information (e.g., merge index, mvp flag or mvp index) which is information for deriving a motion vector. In addition, the motion information may include information on the above-described MVD and/or reference picture index information. In addition, the motion information may include information indicating whether L0 prediction, L1 prediction or bi prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus via a network.

Meanwhile, as described above, the encoding apparatus may generate a reconstructed picture (including reconstructed samples and a reconstructed block) based on the reference samples and the residual samples. This is to enable the decoding apparatus to derive the same prediction result as that performed in the encoding apparatus, thereby increasing coding efficiency. Accordingly, the encoding apparatus may store the reconstructed picture (or the reconstructed samples or the reconstructed block) in a memory and use the same as a reference picture for inter prediction. As described above, an in-loop filtering procedure is further applicable to the reconstructed picture.

The video/image decoding procedure based on inter prediction and the inter predictor in the decoding apparatus may schematically include the following, for example.

The decoding apparatus may perform operation corresponding to operation performed by the encoding apparatus. The decoding apparatus may perform prediction with respect to the current block based on the received prediction information and derive prediction samples.

Specifically, the decoding apparatus may determine a prediction mode for the current block based on the received prediction information (S1210). The decoding apparatus may determine which inter prediction mode is applied to the current block based on the prediction mode information in the prediction information.

For example, whether the merge mode or the (A) MVP mode is applied to the current block may be determined based on the merge flag. Alternatively, one of various inter prediction mode candidates may be selected based on the mode index. The inter prediction mode candidates may include a skip mode, a merge mode and/or a (A) MVP mode or may include various inter prediction modes which will be described below.

The decoding apparatus derives the motion information of the current block based on the determined inter prediction mode (S1220). For example, the decoding apparatus may construct the below-described merge candidate list and select one of the merge candidates included in the merge candidate list, when the skip mode or the merge mode is applied to the current block. The selection may be performed based on the above-described selection information (merge index). The motion information of the current block may be derived using the motion information of the selected merge candidate. The motion information of the selected merge candidate may be used as the motion information of the current block.

As another example, the decoding apparatus may construct a (A) MVP candidate list, which will be described below, when the (A) MVP mode is applied to the current block, and use the motion vector of a motion vector predictor (mvp) candidate selected from among mvp candidates included in the (A) MVP candidate list as the mvp of the current block. The selection may be performed based on the above-described selection information (mvp flag or mvp index). In this case, the MVD of the current block may be derived based on information on the MVD, and the motion vector of the current block may be derived based on the MVD and the mvp of the current block. In addition, the reference picture index of the current block may be derived based on the reference picture index information. A picture indicated by the reference picture index in the reference picture list for the current block may be derived as a reference picture referred to for inter prediction of the current block.

Meanwhile, as described above, the motion information of the current block may be derived without constructing a candidate list. In this case, the motion information of the current block may be derived according to the procedure in the prediction mode which will be described below. In this case, the construction of the candidate list as described above may be omitted.

The decoding apparatus may generate prediction samples for the current block based on the motion information of the current block (S1230). In this case, the reference picture may be derived based on the reference picture index of the current block, and the prediction samples of the current block may be derived using the samples of the reference block indicated by the motion vector of the current block on the reference picture. In this case, as described above, in some cases, a prediction sample filtering procedure for all or some of the prediction samples of the current block may be further performed.

For example, the inter predictor of the decoding apparatus may include a prediction mode determination unit, a motion information derivation unit, and a prediction sample derivation unit, the prediction mode determination unit may determine a prediction mode for the current block based on the received prediction mode information, the motion information derivation unit may derive the motion information (motion vector and/or reference picture index) of the current block based on the received motion information, and the prediction sample derivation unit may derive the prediction samples of the current block.

The decoding apparatus generates residual samples for the current block based on the received residual information (S1240). The decoding apparatus may generate reconstructed samples for the current block based on the prediction samples and the residual samples, and generate a reconstructed picture based on this (S1250). As described above, an in-loop filtering procedure is further applicable to the reconstructed picture.

As described above, the inter prediction procedure may include step of determining an inter prediction mode, step of deriving motion information according to the determined prediction mode, and step of performing prediction based on the derived motion information (prediction sample generation). The inter prediction procedure may be performed in the encoding apparatus and the decoding apparatus as described above.

Quantization/Dequantization

As described above, the quantizer of the encoding apparatus may derive quantized transform coefficients by applying quantization to transform coefficients, and the dequantizer of the encoding apparatus or the dequantizer of the decoding apparatus may derive transform coefficients by applying dequantization to the quantized transform coefficients.

In encoding and decoding of a moving image/still image, a quantization rate may be changed and a compression rate may be adjusted using the changed quantization rate. From the viewpoint of implementation, in consideration of complexity, instead of directly using the quantization rate, a quantization parameter (QP) may be used. For example, quantization parameters having integer values from 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In the quantization process, a transform coefficient C may be received and divided by a quantization rate Qstep, thereby obtaining a quantized transform. In this case, the quantization rate may be multiplied by a scale in consideration of computational complexity to make an integer, and shift operation may be performed by a value corresponding to the scale value. A quantization scale may be derived based on a product of the quantization rate and the scale value. That is, the quantization scale may be derived according to QP. By applying the quantization scale to the transform coefficient C, a quantized transform coefficient C' may be derived.

The dequantization process is an inverse process of the quantization process. By multiplying the quantized transform coefficient C' by the quantization rate Qstep, thereby obtaining a reconstructed transform coefficient C". In addition, a level scale may be derived according to the quantization parameter, and the level scale may be applied to the quantized transform coefficient C', thereby deriving the reconstructed transform coefficient C". The reconstructed transform coefficient C" may be slightly different from an initial transform coefficient C due to loss of the transform and/or quantization process. Accordingly, the even in the encoding apparatus, dequantization may be performed in the same manner as in the decoding apparatus.

Meanwhile, adaptive frequency weighting quantization technology for adjusting a quantization strength according to the frequency may be applied. The adaptive frequency weighting quantization technology refers to a method of differently applying a quantization strength according to the frequency. In adaptive frequency weighting quantization, the quantization strength may be differently applied according to the frequency using a predefined quantization scaling matrix. That is, the above-described quantization/dequantization process may be performed based on the quantization scaling matrix. For example, different quantization scaling matrices may be used according to the size of the current block and/or whether a prediction mode applied to the current block is inter prediction or intra prediction in order to generate the residual signal of the current block. The quantization scaling matrix may be referred to as a quantization matrix or a scaling matrix. The quantization scaling matrix may be predefined. In addition, for frequency adaptive scaling, frequency quantization scale information for the quantization scaling matrix may be constructed/encoded in the encoding apparatus and signaled to the decoding apparatus. The frequency quantization scale information may be referred to as quantization scaling information. The frequency quantization scale information may include scaling list data scaling_list_data. The (modified) quantization scaling matrix may be derived based on the scaling list data. In addition, the frequency quantization scale information may include a present flag indicating whether the scaling list data is present. Alternatively, when the scaling list data is signaled at a higher level (e.g., SPS), information indicating whether the scaling list data is modified at a lower level (e.g., PPS or tile group header, etc.) may be further included.

Transform/Inverse Transform

As described above, the encoding apparatus may derive a residual block (residual samples) based on a block (prediction blocks) predicted through intra/inter/IBC prediction, and derive quantized transform coefficients by applying transform and quantization to the derived residual samples. Information on the quantized transform coefficients (residual information) may be included and encoded in a residual coding syntax and output in the form of a bitstream. The decoding apparatus may acquire and decode information on the quantized transform coefficients (residual information) from the bitstream to derive quantized transform coefficients. The decoding apparatus may derive residual samples through dequantization/inverse transform based on the quantized transform coefficients. As described above, at least one of quantization/dequantization and/or transform/inverse transform may be skipped. When transform/inverse transform is skipped, the transform coefficient may be referred to as a coefficient or a residual coefficient or may still be referred to a transform coefficient for uniformity of expression. Whether transform/inverse transform is skipped may be signaled based on a transform skip flag (e.g., transform_skip_flag).

Transform/inverse transform may be performed based on transform kernel(s). For example, a multiple transform selection (MTS) scheme for performing transform/inverse transform is applicable. In this case, some of a plurality of transform kernel sets may be selected and applied to a current block. A transform kernel may be referred to as various terms such as a transform matrix or a transform type. For example, the transform kernel set may indicate a combination of a vertical-direction transform kernel (vertical transform kernel) and a horizontal-direction transform kernel (horizontal transform kernel).

Transform/inverse transform may be performed in units of CU or TU. That is, transform/inverse transform is applicable to residual samples in a CU or residual samples in a TU. A CU size may be equal to a TU size or a plurality of TUs may be present in a CU region. Meanwhile, the CU size may generally indicate a luma component (sample) CB size. The TU size may generally indicate a luma component (sample) TB size. A chroma component (sample) CB or TB size may be derived based on the luma component (sample) CB or TB size according to a component ratio according to a color format (chroma format) (e.g., 4:4:4, 4:2:2, 4:2:0, etc.). The TU size may be derived based on maxTbSize. For example, when the CU size is greater than maxTbSize, a plurality of TUs (TBs) of maxTbSize may be derived from the CU and transform/inverse transform may be performed in units of TU (TB). maxTbSize may be considered to determine whether to apply various intra prediction types such as ISP. Information on maxTbSize may be predetermined or may be generated and encoded in the encoding apparatus and signaled to the decoding apparatus.

Entropy Coding

All or some of video/image information may be entropy-encoded by the entropy encoder 190 as described above with reference to FIG. 2, and all or some of the video/image information described with reference to FIG. 3 may be entropy-decoded by the entropy decoder 310. In this case, the video/image information may be encoded/decoded in units of a syntax element. In the present disclosure, encoding/decoding information may include encoding/decoding by the method described in this paragraph.

Figure 13:
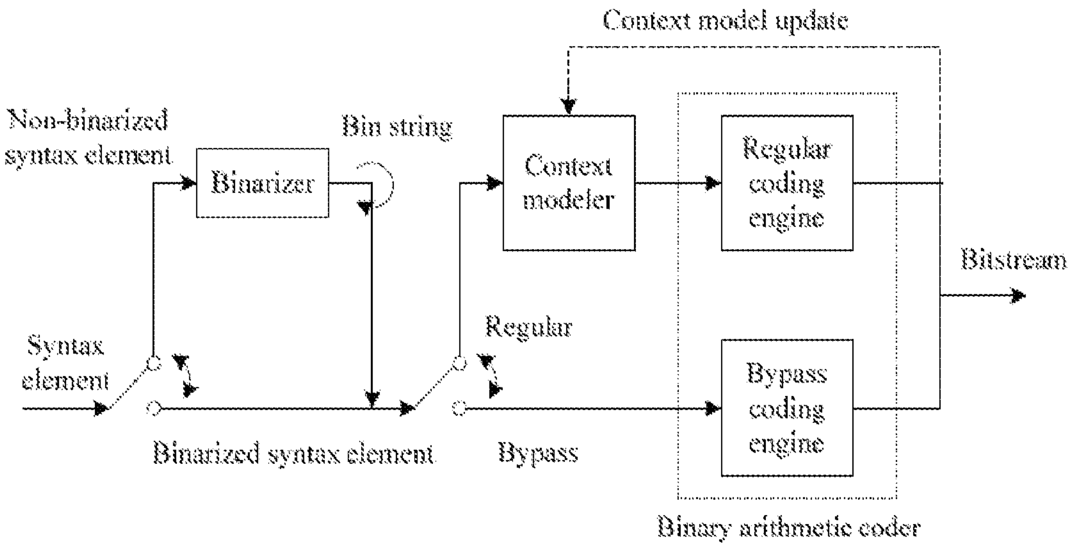
FIG. 13 is a block diagram of a CABAC according to an embodiment for encoding one syntax element.

FIG. 13 is a block diagram of a CABAC for encoding one syntax element. In the encoding process of CABAC, first, when an input signal is a syntax element other than a binary value, the input signal may be transformed into a binary value through binarization. When the input signal already has a binary value, binarization may be bypassed. Here, a binary number 0 or 1 configuring a binary value may be referred to as a bin. For example, when a binary string (bin string) after binarization is 110, each of 1, 1 and 0 may be referred to as one bin. The bin(s) for one syntax element may represent the value of a corresponding syntax element.

The binarized bins may be input to a regular coding engine or a bypass coding engine. The regular coding engine may allocate a context model reflecting a probability value to a corresponding bin and encode the corresponding bit based on the allocated context model. The regular coding engine may code each bin and then update a probability model for the corresponding bin. The bins coded in this way may be referred to as context-coded bins. The bypass coding engine may bypass a procedure for estimating a probability with respect to an input bin and a procedure for updating a probability mode applied to a corresponding bin after coding. The bypass coding engine may code an input bin by applying a uniform probability distribution (e.g., 50:50) instead of allocating a context, thereby improving a coding speed. Bins coded in this way may be referred to as a bypass bin. A context model may be allocated and updated for each context-coded (regularly coded) bin, and the context model may be indicated based on ctxidx or ctxInc. ctxidx may be derived based on ctxInc. Specifically, for example, a context index ctxidx indicating the context model for each of the regularly coded bins may be derived as a sum of a context index increment (ctxInc) and a context index offset (ctxIdxOffset). Here, ctxInc may be differently derived for each bin. ctxIdxOffset may be represented by a lowest value of ctxIdx. The lowest value of ctxIdx may be referred to as an initial value initValue of ctxIdx. ctxIdxOffset is generally a value used to be distinguished from context models for other syntax elements, and a context model for one syntax element may be distinguished/derived based on ctxinc.

In the entropy encoding procedure, whether encoding is performed through the regular coding engine or the bypass coding engine may be determined and a coding path may be switched. Entropy decoding may be performed in the reverse order of the same process as entropy encoding.

Figure 14:
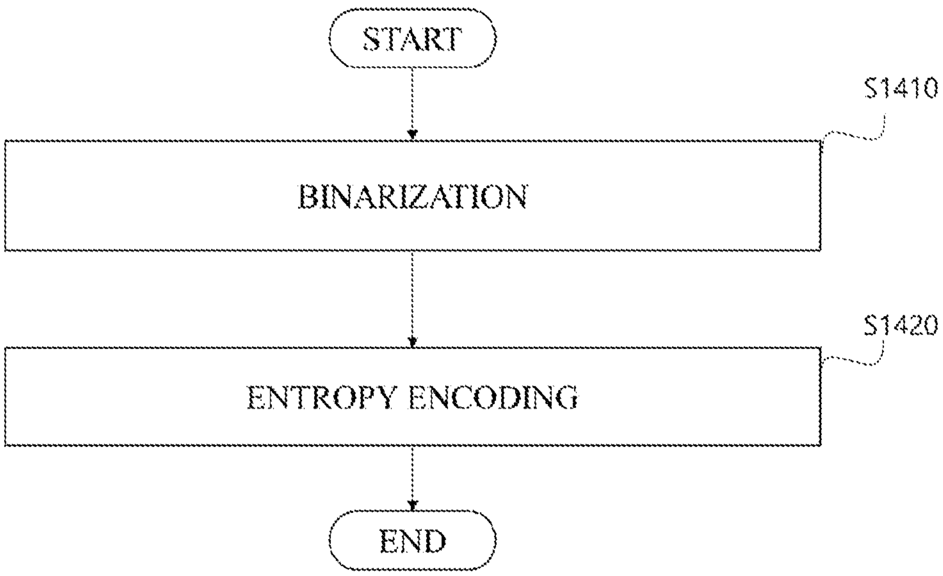
FIGS. 14 to 17 are views illustrating entropy encoding and decoding according to an embodiment.
Figure 15:
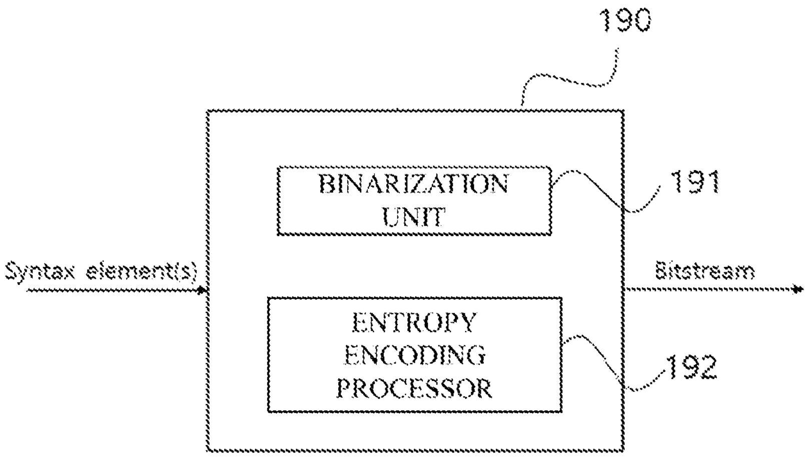

The above-described entropy coding may be performed, for example, as shown in FIGS. 14 and 15. Referring to FIGS. 14 and 15, the encoding apparatus (entropy encoder) may perform an entropy coding procedure for image/video information. The image/video information may include partitioning related information, prediction related information (e.g., inter/intra prediction distinction information, intra prediction mode information, inter prediction mode information, etc.), residual information, in-loop filtering related information, etc. or may include various syntax elements related thereto. Entropy coding may be performed in units of a syntax element. Steps S1410 to S1420 of FIG. 14 may be performed by the entropy encoder 190 of the encoding apparatus of FIG. 2.

The encoding apparatus may perform binarization with respect to a target syntax element (S1410). Here, binarization may be based on various binarization methods such as a Truncated Rice binarization process, Fixed-length binarization process, etc., and the binarization method for the target syntax element may be predefined. The binarization procedure may be performed by a binarization unit 191 in the entropy encoder 190.

The encoding apparatus may entropy encoding with respect to the target syntax element (S1420). The encoding apparatus may perform regular coding based (context based) or bypass coding based encoding with respect to a bin string of the target syntax element based on an entropy coding technique such as CABAC (context-adaptive arithmetic coding) or CAVLC (context-adaptive variable length coding), and the output thereof may be included in a bitstream. The entropy encoding procedure may be performed by an entropy encoding processor 192 in the entropy encoder 190. As described above, the bitstream may be transmitted to the decoding apparatus through a (digital) storage medium or a network.

Figure 16:
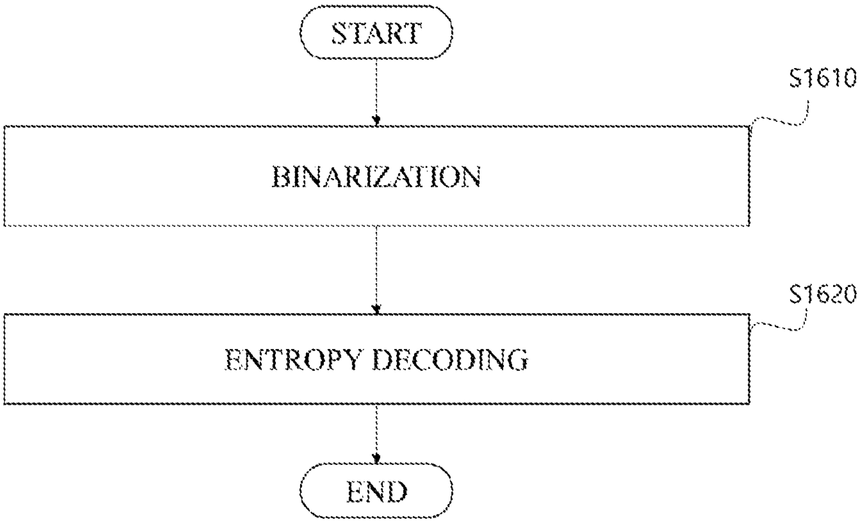
Figure 17:
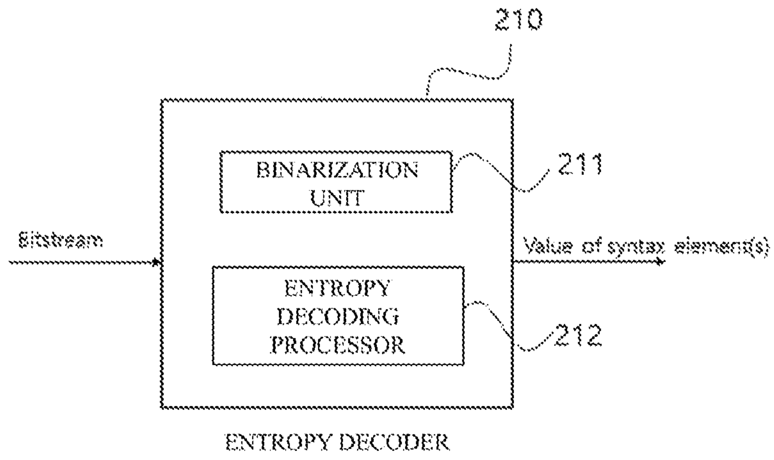

Referring to FIGS. 16 and 17, the decoding apparatus (entropy decoder) may decode encoded image/video information. The image/video information may include partitioning related information, prediction related information (e.g., inter/intra prediction distinction information, intra prediction mode information, inter prediction mode information, etc.), residual information, in-loop filtering related information, etc. or may include various syntax elements related thereto. Entropy coding may be performed in units of a syntax element. Steps S1610 to S1620 of FIG. 16 may be performed by the entropy decoder 210 of the decoding apparatus of FIG. 3.

The decoding apparatus may perform binarization with respect to a target syntax element (S1610). Here, binarization may be based on various binarization methods such as a Truncated Rice binarization process, Fixed-length binarization process, etc., and the binarization method for the target syntax element may be predefined. The decoding apparatus may derive available bin strings (bin string candidates) for available values of the target syntax element through the binarization procedure. The binarization procedure may be performed by a binarization unit 211 in the entropy decoder 210.

The decoding apparatus may perform entropy decoding with respect to the target syntax element (S1620). The decoding apparatus may compare the derived bin string with available bin strings for a corresponding syntax element, while sequentially decoding and parsing the bins for the target syntax element from input bit(s) in the bitstream. If the derived bin string is equal to one of the available bin strings, a value corresponding to the corresponding bin string may be derived as a value of the corresponding syntax element. If not, the above-described procedure may be performed again after a next bit in the bitstream is further parsed. Through such a process, corresponding information may be signaled using a variable length bit without using a start or end bit for specific information (specific syntax element) in the bitstream. Through this, a relatively fewer bits may be allocated to a low value and overall coding efficiency may be improved.

The decoding apparatus may perform context based or bypass based decoding with respect to the bins in the bin string from the bitstream based on an entropy coding technique such as CABAC or CAVLC. The entropy decoding procedure may be performed by an entropy decoding processor 212 in the entropy decoder 210. The bitstream may include a variety of information for image/video decoding as described above. As described above, the bitstream may be transmitted to the decoding apparatus through a (digital) storage medium or a network.

In the present disclosure, a table (syntax table) including syntax elements may be used to indicate signaling of information from the encoding apparatus to the decoding apparatus. The order of the syntax elements of the table including the syntax elements used in the present disclosure may indicate the parsing order of the syntax elements from the bitstream. The encoding apparatus may construct and encode the syntax element such that the decoding apparatus parses the syntax element in the parsing order, and the decoding apparatus may parse and decode the syntax elements of the corresponding syntax table from the bitstream according to the parsing order and obtain the values of the syntax elements.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 18:
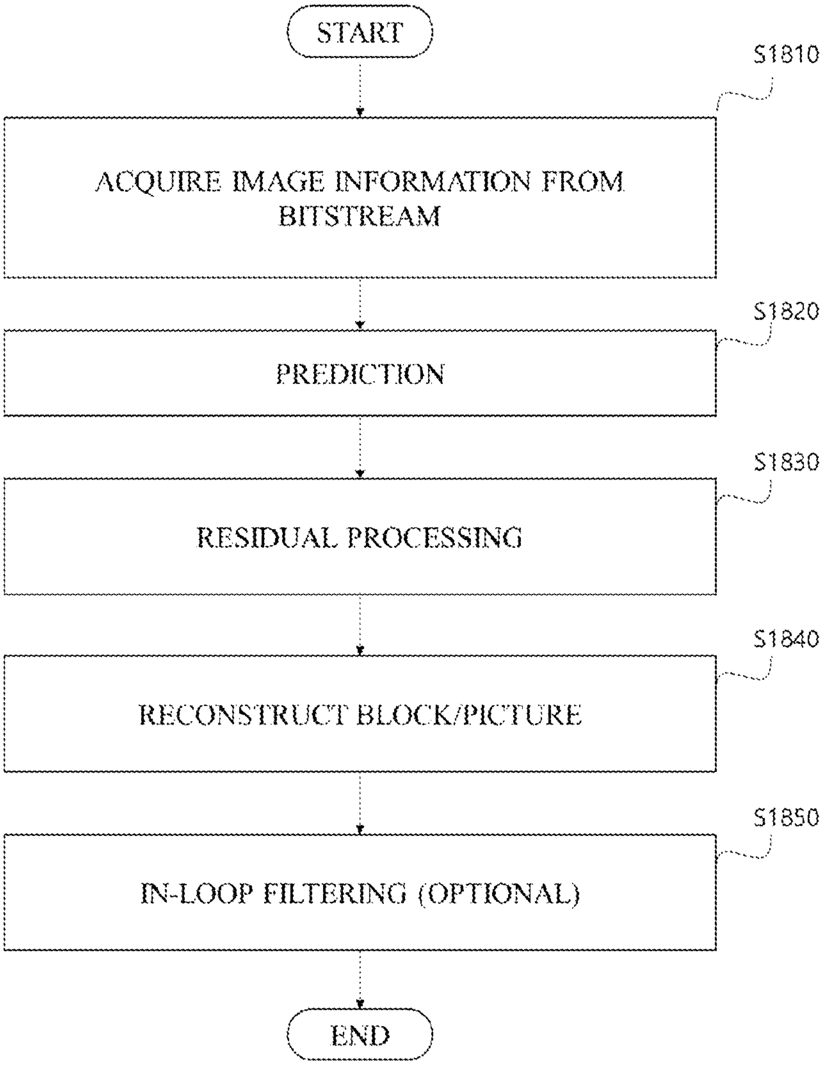
FIGS. 18 and 19 are views showing an example of a picture decoding and encoding procedure according to an embodiment.

FIG. 18 shows an example of a schematic picture decoding procedure, to which embodiment(s) of the present disclosure is applicable. In FIG. 18, S1810 may be performed in the entropy decoder 210 of the decoding apparatus, S1820 may be performed in a predictor including the intra predictor 265 and the inter predictor 260, S1830 may be performed in a residual processor including the dequantizer 220 and the inverse transformer 230, S1840 may be performed in the adder 235, and S1850 may be performed in the filter 240. S1810 may include the information decoding procedure described in the present disclosure, S1820 may include the inter/intra prediction procedure described in the present disclosure, S1830 may include a residual processing procedure described in the present disclosure, S1840 may include the block/picture reconstruction procedure described in the present disclosure, and S1850 may include the in-loop filtering procedure described in the present disclosure.

Referring to FIG. 18, the picture decoding procedure may schematically include a procedure (S1810) for obtaining image/video information (through decoding) from a bitstream, a picture reconstruction procedure (S1820 to S1840) and an in-loop filtering procedure (S1850) for a reconstructed picture. The picture reconstruction procedure may be performed based on prediction samples and residual samples obtained through inter/intra prediction (S1820) and residual processing (S1830) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S1850) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 19:
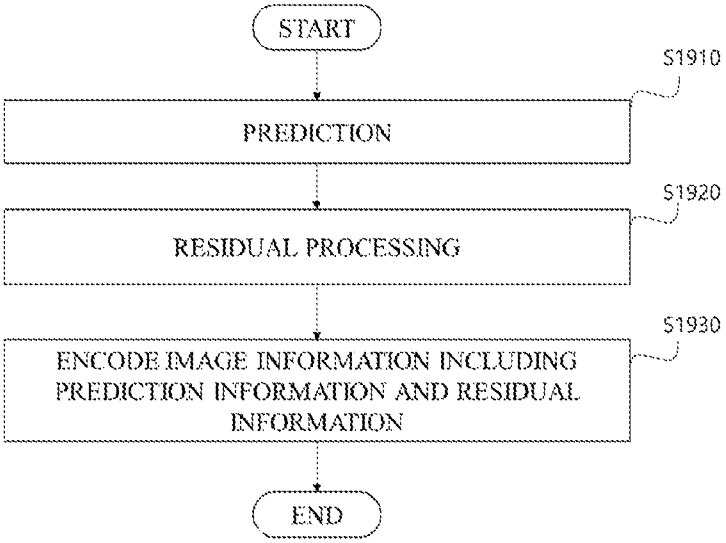

FIG. 19 shows an example of a schematic picture encoding procedure, to which embodiment(s) of the present disclosure is applicable. In FIG. 19, S1910 may be performed in the predictor including the intra predictor 185 or inter predictor 180 of the encoding apparatus described above with reference to FIG. 2, S1920 may be performed in a residual processor including the transformer 120 and/or the quantizer 130, and S1930 may be performed in the entropy encoder 190. S1910 may include the inter/intra prediction procedure described in the present disclosure, S1920 may include the residual processing procedure described in the present disclosure, and S1930 may include the information encoding procedure described in the present disclosure.

Referring to FIG. 19, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of S1910 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 20:
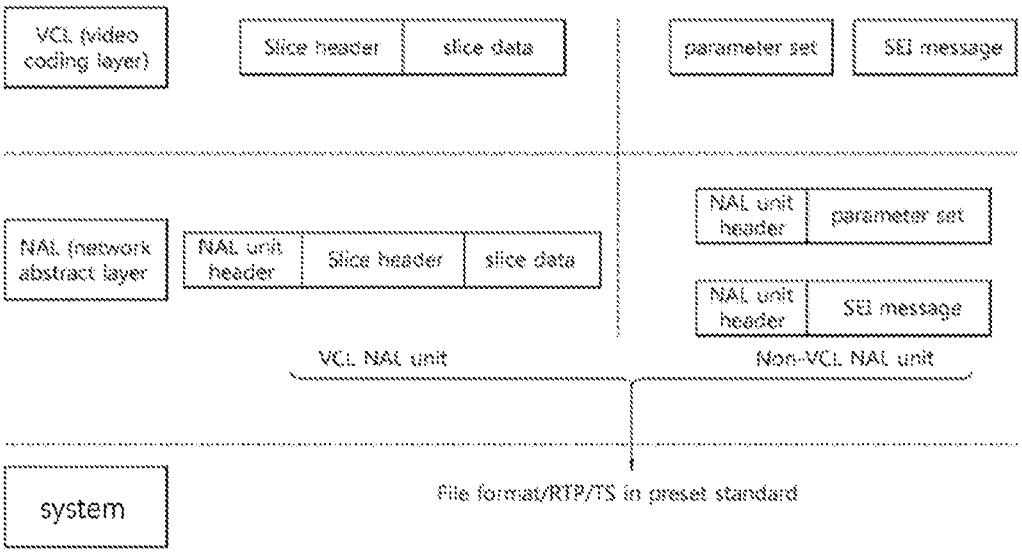
FIG. 20 is a view showing a layer structure for a coded image according to an embodiment.

FIG. 20 is a view showing a layer structure for a coded image. The coded image may be classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

- DCI (Decoding capability information) NAL unit: Type for NAL unit including DCI
- VPS (Video Parameter Set) NAL unit: Type for NAL unit including VPS
- SPS (Sequence Parameter Set) NAL unit: Type for NAL unit including SPS
- PPS (Picture Parameter Set) NAL unit: Type for NAL unit including PPS
- APS (Adaptation Parameter Set) NAL unit: Type for NAL unit including APS
- PH (Picture header) NAL unit: Type for NAL unit including PH The above-described NAL unit types may have syntax information for a NAL unit type, and the syntax information may be stored in a NAL unit header and signaled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters commonly applicable to an overall video. The DCI may include information/parameters related to decoding capability. In the present disclosure, a high level syntax (HLS) may include at least one of the APS syntax, the PPS syntax, the SPS syntax, the VPS syntax, the DCI syntax, the picture header syntax or the slice header syntax. Meanwhile, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Partitioning of Picture Using Subpicture, Slice and Tile

One picture may be partitioned into at least one tile row and at least one tile column. One tile may be composed of a sequence of CTUs and may cover a rectangular region of one picture.

The slice may be composed of an integer number of complete tiles or an integer number of consecutive complete CTU rows in one picture.

For the slice, two modes may be supported: one may be called a raster-scan slice mode and the other may be called a rectangular slice mode. In the raster-scan slice mode, one slice may include a complete tile sequence present in one picture in the tile raster scan order. In the rectangular slice mode, one slice may include a plurality of complete tiles assembled to form a rectangular region of a picture or a plurality of consecutive complete CTU rows of one tile assembled to form a rectangular region of a picture. Tiles in the rectangular slice may be scanned in the tile raster scan order in the rectangular region corresponding to the slice. The subpicture may include at least one slice assembled to cover a rectangular region of a picture.

Figure 21:
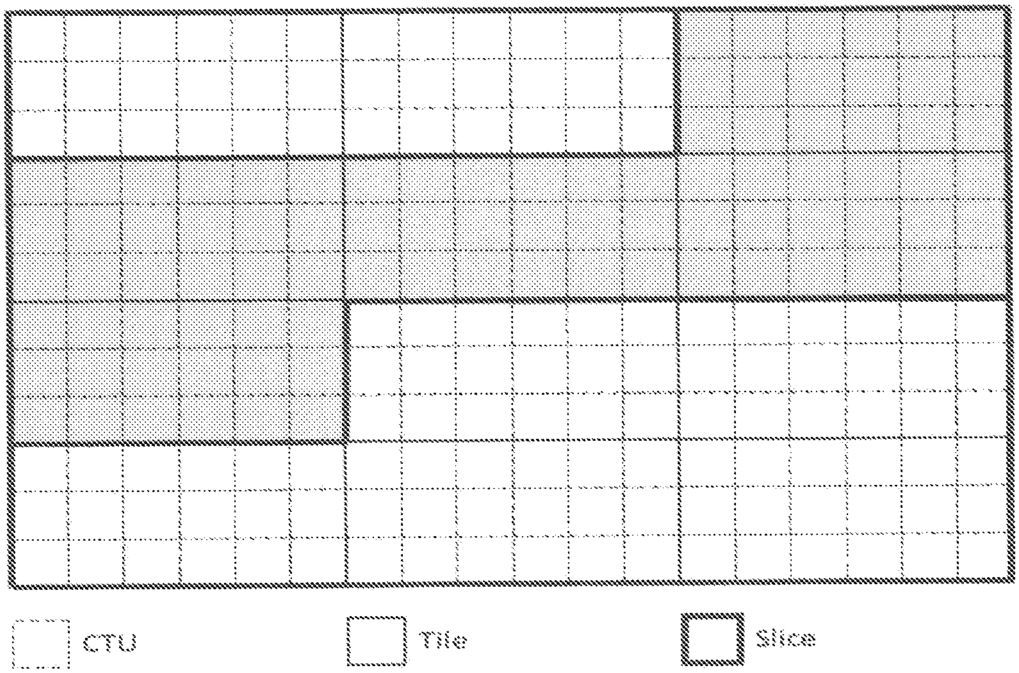
FIGS. 21 to 24 are views illustrating an embodiment of partitioning a picture using a tile, a slice and a subpicture.
Figure 22:
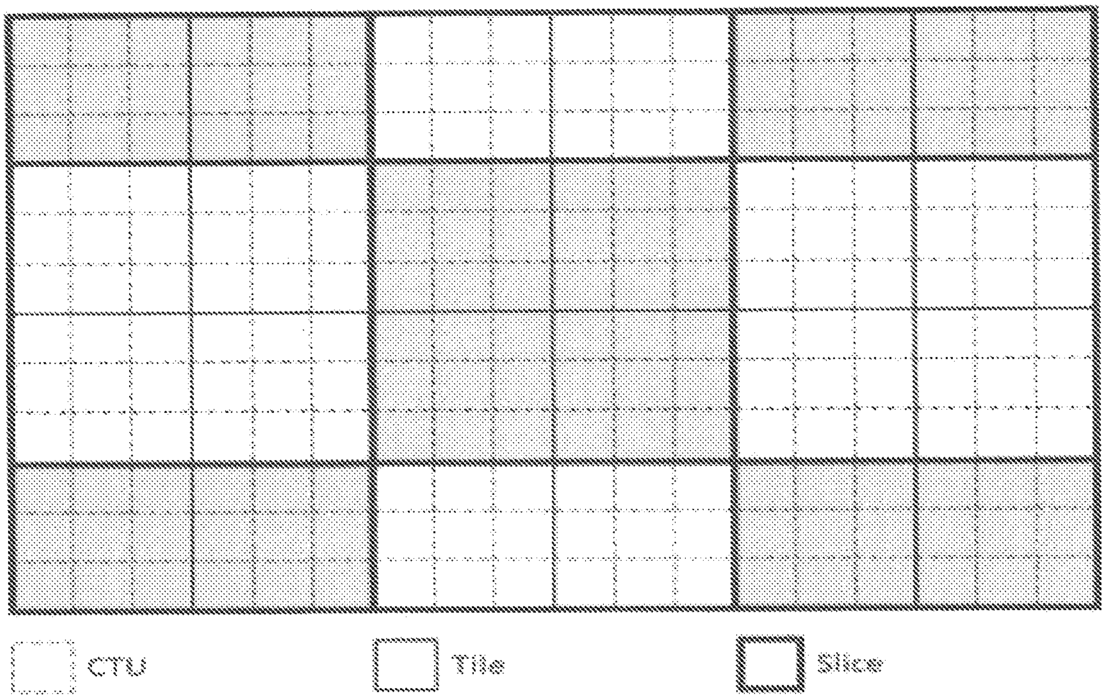
Figure 23:
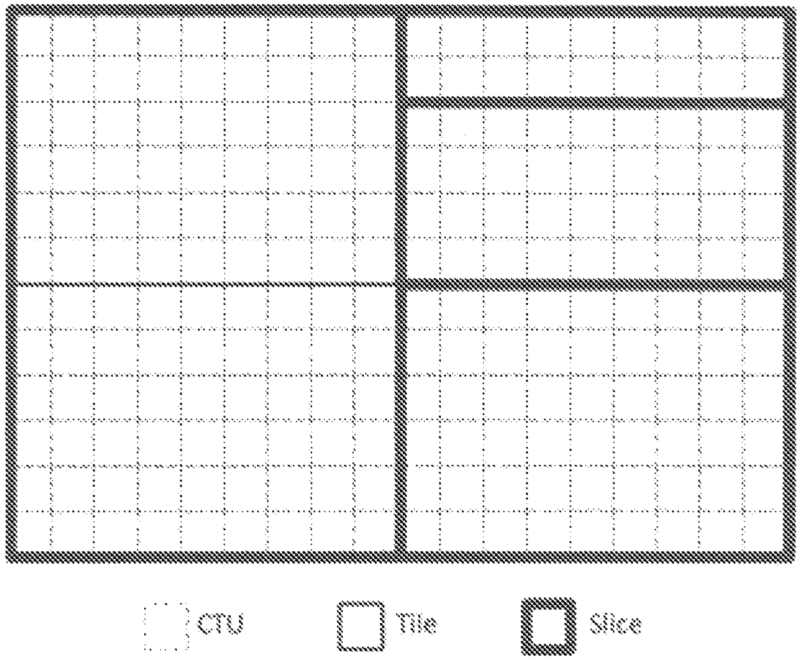

In order to describe the partitioning relationship of a picture in greater detail, a description will be given with reference to FIGS. 21 to 24. FIGS. 21 to 24 show embodiments of partitioning a picture using a tile, a slice and a subpicture. FIG. 21 shows an example of a picture partitioned into 12 tiles and three raster-scan slices. FIG. 22 shows an example of a picture partitioned into 24 tiles (six tile columns and four tile rows) and 9 rectangular slices. FIG. 23 shows an example of a picture partitioned into four tiles (two tile columns and two tile rows) and four rectangular slices.

Figure 24:
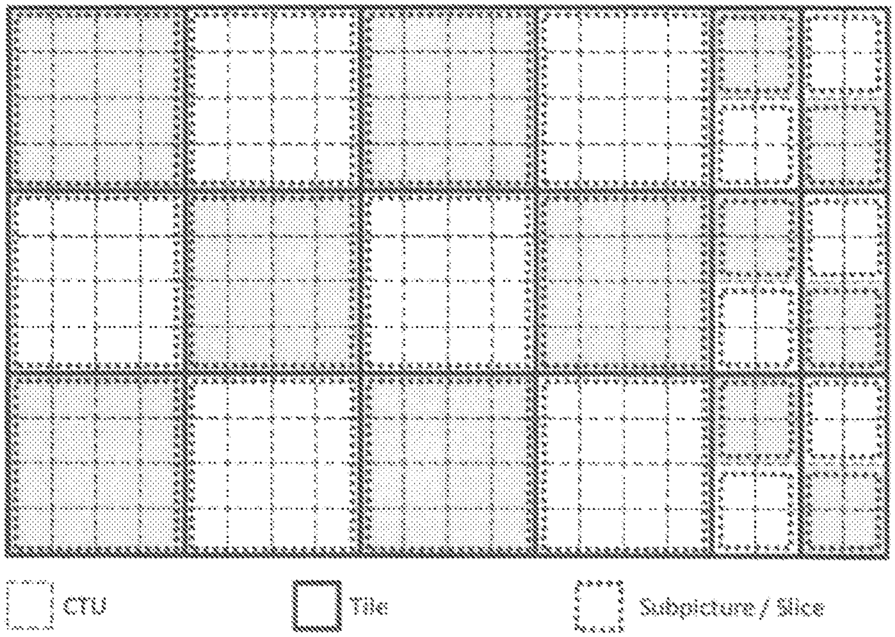

FIG. 24 shows an example of partitioning a picture into subpictures. In FIG. 24, the picture may be partitioned into 12 left tiles covering one slice composed of 4×4 CTUs and six right tiles covering vertically assembled two slices composed of 2×2 CTUs, such that one picture is partitioned into 24 slices and 24 subpictures having different areas. In the example of FIG. 24, an individual slice corresponds to an individual subpicture.

HLS (High Level Syntax) Signaling and Semantics

As described above, the HLS may be encoded and/or signaled for video and/or image encoding. As described above, in the present disclosure, video/image information may be included in the HLS. In addition, the image/video encoding method may be performed based on such image/video information.

Picture Header and Slice Header

The encoded picture may be composed of at least one slice. Parameters describing the encoded picture may be signaled in a picture header (PH) or parameters describing the slice may be signaled in a slice header (SH). The PH may be transmitted as a NAL unit type therefor. The SH may be provided at the starting point of the NAL unit configuring the payload of the slice (e.g., slice data).

Picture Partitioning Signaling

In one embodiment, one picture may be partitioned into a plurality of subpictures, tiles and/or slices. Signaling of a subpicture may be provided in a sequence parameter set. Signaling of a tile and a rectangular slice may be provided in a picture parameter set. In addition, signaling of a raster-scan slice may be provided in a slice header.

FIG. 25 shows an embodiment of a syntax for a sequence parameter set. In the syntax of FIG. 25, syntax elements are as follows.

A subpic_info_present_flag syntax element may indicate whether subpicture information is present. For example, a first value (e.g., 0) of subpic_info_present_flag may indicate that subpicture information of a coded layer video sequence (CLVS) is not present in a bitstream, and only one subpicture is present in an individual picture of the CLVS. A second value (e.g., 1) of subpic_info_present_flag may indicate that subpicture information of a coded layer video sequence (CLVS) is present in a bitstream, and at least one subpicture may be present in an individual picture of the CLVS.

Here, the CLVS may mean a layer of an encoded video sequence. The CLVS may be a sequence of PUs having the same nuh_layer_id as a prediction unit (PU) of a gradual decoding refresh (GDR) picture or an intra random access point (IRAP) picture which is not output until a reconstructed signal is generated.

A syntax element sps_num_subpics_minus1 may indicate the number of subpictures. For example, a value obtained by adding 1 to this may represent the number of subpictures belonging to the individual picture of the CLVS. The value of sps_num_subpics_minus1 may have a value from 0 to Ceil(pic_width_max_in_luma_samples÷CtbSizeY)*Ceil (pic_height_max_in_luma_samples÷CtbSizeY)−1. When the value of sps_num_subpics_minus1 is not present, the value of sps_num_subpics_minus1 may be derived as 0.

A value 1 of a syntax element sps_independent_subpics_flag may indicate that intra prediction is not performed beyond the boundary of a subpicture in the CLVS, inter prediction is not performed, and in-loop filtering operation is not performed.

A value 0 of a syntax element sps_independent_subpics_flag may indicate that inter prediction or in-loop filtering operation may be performed beyond the boundary of a subpicture in the CLVS. When the value of sps_independent_subpics_flag is not present, the value of sps_independent_subpics_flag may be derived as 0.

A syntax element subpic_ctu_top_left_x[i] may indicate a horizontal position of a top-left CTU of an i-th subpicture in units of CtbSizeY. The length of the subpic_ctu_top_left_x[i] syntax element may be Ceil(Log 2((pic_width_max_in_luma_samples+CtbSizeY−1)>>CtbLog 2SizeY)) bits. When subpic_ctu_top_left_x[i] is not present, the value thereof may be derived as 0. Here, pic_width_max_in_luma_samples may be a variable indicating a maximum width of a picture expressed in units of a luma sample. CtbSizeY may be a variable indicating the size of the luma sample unit size of a CTB. CtbLog 2SizeY may be a variable indicating a value obtained by taking log 2 to the luma sample unit size of the CTB.

A syntax element subpic_ctu_top_left_y[i] may indicate a vertical position of a top-left CTU of an i-th subpicture in units of CtbSizeY. The length of subpic_ctu_top_left_x[i] syntax element may be Ceil(Log 2 ((pic_height_max_in_luma_samples+CtbSizeY−1)>>CtbLog 2SizeY)) bits. Here, pic_height_max_in_luma_samples may be a variable indicating a maximum height of a picture expressed in units of a luma sample. When subpic_ctu_top_left_y[i] is not present, the value thereof may be derived as 0.

A value obtained by adding 1 to a syntax element subpic_width_minus1[i] may indicate the width of a first subpicture and the unit thereof may be CtbSizeY. The length of subpic_width_minus1[i] may be Ceil(Log 2((pic_width_max_in_luma_samples+CtbSizeY−1)>>CtbLog 2SizeY)) bits. When the value of subpic_width_minus1[i] is not present, the value of subpic_width_minus1[i] may be calculated as $$((\text{pic\_width\_max\_in\_luma\_samples} + CtbSizeY - 1) >> CtbLog2SizeY) - \text{subpic\_ctu\_top\_left\_x}[i] - 1.$$

A value obtained by adding 1 to a syntax element subpic_height_minus1[i] may indicate the height of a first subpicture and the unit thereof may be CtbSizeY. The length of subpic_height_minus1[i] may be Ceil(Log 2 ((pic_height_max_in_luma_samples+CtbSizeY−1)>>CtbLog 2SizeY)) bits. When subpic_height_minus1[i] is not present, the value of subpic_height_minus1[i] may be calculated as $$((\text{pic\_height\_max\_in\_luma\_samples} + CtbSizeY - 1) >> CtbLog2SizeY) - \text{subpic\_ctu\_top\_left\_x}[i] - 1.$$

A value 1 of a syntax element subpic_treated_as_pic_flag[i] indicates that an i-th subpicture of each encoded picture in the CLVS is treated as one picture except for in-loop filtering operation. A value 0 of subpic_treated_as_pic_flag[i] indicates that an i-th subpicture of each encoded picture in the CLVS is not treated as one picture except for in-loop filtering operation. When subpic_treated_as_pic_flag[i] is not present, the value of subpic_treated_as_pic_flag[i] may be set to the value of sps_independent_subpics_flag.

A value 1 of a syntax element loop_filter_across_subpic_enabled_flag[i] may indicate that in-loop filtering may be performed beyond the boundary of an i-th subpicture in each encoded picture in the CLVS. A value 0 of loop_filter_across_subpic_enabled_flag[i] may indicate that in-loop filtering is not performed beyond the boundary of an i-th subpicture in each encoded picture in the CLVS. When the value of loop_filter_across_subpic_enabled_flag[i] is not present, the value of loop_filter_across_subpic_enabled_flag[i] may be determined to be 1−sps_independent_subpics_flag.

FIG. 26 is a view showing an embodiment of a syntax of a picture parameter set. In the syntax of FIG. 26, syntax elements are as follows.

A first value (e.g., 0) of syntax element no_pic_partition_flag may indicate that each picture referring to a PPS may be partitioned into two or more tiles or slices. A second value (e.g., 1) of no_pic_partition_flag may indicate that picture partitioning is not applied to each picture referring to a PPS.

A value obtained by adding 5 to a syntax element pps_log 2_ctu_size_minus5 may indicate the luma coding block size of each CTU. The value of pps_log 2_ctu_size_minus5 may be limited to be equal to sps_log 2_ctu_size_minus5 indicating the same value in a sequence parameter set.

A value obtained by adding 1 to a syntax element num_exp_tile_columns_minus1 indicates the number of tile column widths provided explicitly. The value of num_exp_tile_columns_minus1 may have a value from 0 to PicWidthInCtbsY−1. When the value of no_pic_partition_flag is 1, the value of num_exp_tile_columns_minus1 may be derived as 0.

A value obtained by adding 1 to a syntax element num_exp_tile_rows_minus1 may indicate the number of tile row heights provided explicitly. The value of num_exp_tile_rows_minus1 may have a value from 0 to PicHeightInCtbsY−1. When the value of no_pic_partition_flag is 1, the value of num_exp_tile_rows_minus1 may be derived as 0.

A value obtained by adding 1 to a syntax element tile_column_width_minus1[i] may indicate the width of an i-th tile column in units of a CTB. Here, i may have a value from 0 to num_exp_tile_columns_minus1-1.

tile_column_width_minus1 [num_exp_tile_columns_minus1] may be used to derive the width of a tile with an index of a tile column equal to or greater than num_exp_tile_columns_minus1. The value of tile_column_width_minus1[i] may have a value from 0 to PicWidthInCtbsY−1. When tile_column_width_minus1[i] is not provided from a bitstream, the value of tile_column_width_minus1[0] may be set to a value of PicWidthInCtbsY−1.

A value obtained by adding 1 to a syntax element tile_row_height_minus1[i] may indicate the height of an i-th tile row in units of a CTB. Here, i may have a value from 0 to num_exp_tile_rows_minus1-1. tile_row_height_minus1 [ num_exp_tile_rows_minus1] may be used to derive the height of a tile with an index of a tile row equal to or greater than num_exp_tile_rows_minus1. The value of tile_row_height_minus1[i] may have a value from 0 to PicHeightInCtbsY−1. When tile_row_height_minus1[i] is not provided from a bitstream, the value of tile_row_height_minus1 [0] may be set to a value of PicHeightInCtbsY−1.

A value 0 of a syntax element rect_slice_flag may indicate that tiles in each slice are scanned in a raster scan order and slice information is not signaled through a picture parameter set. A value 1 of rect_slice_flag may indicate that tiles in each slice cover a rectangular region of a picture and slice information is signaled through a picture parameter set. Here, a variable NumTilesInPic may represent the number of tiles present in a picture. When rect_slice_flag is not present in a bitstream, the value of rect_slice_flag may be derived as 1. Meanwhile, when the value of subpic_info_present_flag is 1, the value of rect_slice_flag may be forced to be 1.

A value 1 of a syntax element single_slice_per_subpic_flag may indicate that each subpicture is composed of only one rectangular slice. A value 0 of single_slice_per_subpic_flag may indicate that each subpicture is composed of at least one rectangular slice. When single_slice_per_subpic_flag is not present in a bitstream, the value of single_slice_per_subpic_flag may be derived as 0.

A value obtained by adding 1 to a syntax element num_slices_in_pic_minus1 may indicate the number of slices in a picture. A value 0 of a syntax element tile_idx_delta_present_flag may indicate that a tile_idx_delta[i] syntax element is not present in a picture parameter set and all picture referring to the picture parameter set are partitioned into rectangular slice rows and rectangular slice columns according to the slice raster scan order. A value 1 of tile_idx_delta_present_flag may indicate that a tile_idx_delta[i] syntax element may be present in a picture parameter set and all rectangular slices belonging to pictures referring to a picture parameter set are specified in an order indicated by the value of tile_idx_delta[i] according to an increasing i value. When tile_idx_delta_present_flag is not present, the value of tile_idx_delta_present_flag may be derived as 0.

A value obtained by adding 1 to a syntax element slice_width_in_tiles_minus1[i] may indicate the width of an i-th rectangular slice in units of a tile column. The value of slice_width_in_tiles_minus1[i] may have a value from 0 to NumTileColumns−1. Here, when i is less than num_slices_in_pic_minus1 and the value of NumTileColumns is 1, the value of slice_width_in_tiles_minus1[i] may be derived as 0. Here, a variable NumTileColumns may indicate the number of tile columns present in a current picture. Here, a variable NumTileRows may indicate the number of tile rows present in a current picture.

A value obtained by adding 1 to a syntax element slice_height_in_tiles_minus1[i] may indicate the height of an i-th rectangular slice in unit of a tile row, when the value of num_exp_slices_in_tile[i] is 0. The value of slice_height_in_tiles_minus1[i] may have a value from 0 to NumTileRows−1. When the value of i is less than num_slices_in_pic_minus1 and the value of slice_height_in_tiles_minus1[i] is not acquired from a bitstream, the value of slice_height_in_tiles_minus1[i] may be derived by the following equation.

$$\text{slice\_height\_in\_tiles\_minus1}[i] = NumTileRows == 1\,?\,0 : \text{slice\_height\_in\_tiles\_minus1}[i-1] \quad \text{[Equation 1]}$$

SliceTopLeftTileIdx may be a variable indicating the index of a top-left tile of a slice.

A syntax element num_exp_slices_in_tile[i] may indicate the number of heights of a slice provided explicitly with respect to slices in a tile (e.g., a tile having the same tile index as SliceTopLeftTileIdx[i]) including an i-th slice. The value of num_exp_slices_in_tile[i] may have a value from 0 to RowHeight[SliceTopLeftTileIdx[i]/NumTileColumns]−1. When num_exp_slices_in_tile[i] is not provided from a bitstream, the value of num_exp_slices_in_tile[i] may be derived as 0. Here, RowHight[i] may be a variable indicating the height of an i-th tile in units of a CTB. Here, when the value of num_exp_slices_in_tile[i] is 0, a tile including an i-th slice may not be partitioned into a plurality of tiles.

A value obtained by adding 1 to a syntax element exp_slice_height_in_ctus_minus1[i][j] may indicate the height of a j-th rectangular slice in a tile including an i-th slice in units of a CTU. The value of exp_slice_height_in_ctus_minus1[i][j] may have a value from 0 to RowHeight [SliceTopLeftTileIdx[i]/NumTileColumns]−1.

A variable NumSlicesInTile[i] may indicate the number of slices present in a tile including an i-th slice.

A syntax element tile_idx_delta[i] may indicate a difference between a tile index of a tile including a first CTU in an (i+1)-th rectangular slice and a tile index of a tile including a first CTU in an i-th rectangular slice. The value of tile_idx_delta[i] may have a value from −NumTilesInPic+1 to NumTilesInPic−1. When the value of tile_idx_delta[i] is not present in a bitstream, the value of tile_idx_delta[i] may be derived as 0. When the value of tile_idx_delta[i] is present, the value of tile_idx_delta[i] may be forced to be a non-zero value.

A value 1 of a syntax element loop_filter_across_tiles_enabled_flag may indicate that in-loop filtering operation may be performed beyond a tile boundary in a picture referring to a picture parameter set. A value 0 of loop_filter_across_tiles_enabled_flag may indicate that in-loop filtering operation is not performed beyond a tile boundary in a picture referring to a picture parameter set.

In-loop filtering operation may include any one of a deblocking filter, a sample adaptive offset (SAO) filter or an adaptive loop filter (ALF). When loop_filter_across_tiles_enabled_flag is not present in a bitstream, the value of loop_filter_across_tiles_enabled_flag may be derived as 1.

A value 1 of a syntax element loop_filter_across_slices_enabled_flag may indicate that in-loop filtering operation may be performed beyond a slice boundary in a picture referring to a picture parameter set. A value 0 of loop_filter_across_slice_enabled_flag may indicate that in-loop filtering operation is not performed beyond a slice boundary in a picture referring to a picture parameter set. In-loop filtering operation may include any one of a deblocking filter, a sample adaptive offset (SAO) filter or an adaptive loop filter (ALF). When loop_filter_across_slice_enabled_flag is not present in a bitstream, the value of loop_filter_across_slice_enabled_flag may be derived as 1.

Figures 27, 28:
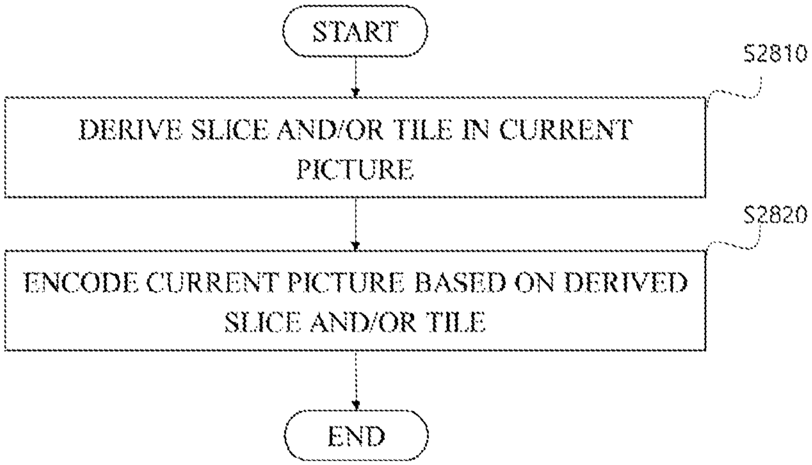
FIG. 27 is a view showing an embodiment of a syntax of a slice header.
FIGS. 28 and 29 are views showing an embodiment of an encoding method and a decoding method.

FIG. 27 is a view showing an embodiment of a syntax of a slice header. In the syntax of FIG. 27, syntax elements are as follows.

A syntax element slice_subpic_id may indicate the subpicture ID of a subpicture including a slice. When the value of slice_subpic_id is present in a bitstream, the value of a variable CurrSubpicIdx may be derived as the value of CurrSubpicIdx with a value of SubpicIdVal[CurrSubpicIdx] of slice_subpic_id. Otherwise, (slice_subpic_id is not present in a bitstream), the value of CurrSubpicIdx may be derived as 0. The length of slice_subpic_id may be sps_subpic_id_len_minus1+1 bits. Here, NumSlicesInSubpic[i] may be a variable indicating the number of slices in an i-th subpicture. A variable CurrSubpicIdx may indicate the index of a current subpicture.

A syntax element slice_address indicates a slice address of a slice. When slice_address is not provided, the value of slice_address may be derived as 0.

Meanwhile, when the value of rect_slice_flag is 0, the slice address may be equal to the raster scan tile index of a first tile in a slice and the length of slice_address syntax element may be Ceil(Log 2 (NumTilesInPic)) bits, and slice_address may have a value from 0 to NumTilesInPic−1. Otherwise, (if the value of rect_slice_flag is a non-zero value, for example, 1), the address of the slice may be a subpicture level slice index of a slice, and the length of slice_address syntax element may be $$Ceil(\text{Log2}(NumSlicesInSubpic[CurrSubpicIdx]))\ \text{bits},$$

and slice_address syntax element may have a value from $$0\ \text{to}\ NumSlicesInSubpic[CurrSubpicIdx]-1.$$

A syntax element sh_extra_bit[i] may have a value of 0 or 1. The decoding apparatus may perform decoding regardless of the value of sh_extra_bit[i]. To this end, the encoding apparatus needs to generate a bitstream such that decoding is performed regardless of the value of sh_extra_bit[i]. Here, NumExtraShBits may be a variable indicating the number of bits further required to signal information in a slice header.

A value obtained by adding 1 to a syntax element num_tiles_in_slice_minus1 may indicate the number of tiles in a slice, if present. The value of num_tiles_in_slice_minus1 may have a value from 0 to NumTilesInPic−1.

A variable NumCtusInCurrSlice indicating the number of CTUs in a current slice and a list CtbAddrInCurrSlice[i] indicating the picture raster scan address of an i-th CTB in a slice (where, i has a value from 0 to NumCtusInCurrSlice−1) may be derived as follows.

TABLE 2

```
if ( rect_slice_flag ) {
  picLevelSliceIdx = slice_address
  for ( j = 0; j < CurrSubpicIdx; j++ )
    picLevelSliceIdx += NumSlicesInSubpic[ j ]
  NumCtusInCurrSlice = NumCtusInSlice [ picLevelSliceIdx ]
  for ( i = 0; i < NumCtusInCurrSlice; i++ )
    CtbAddrInCurrSlice[ i ] = CtbAddrInSlice [ picLevelSliceIdx ] [ i ]
} else {
  NumCtusInCurrSlice = 0
  for ( tileIdx = slice_address; tileIdx <= slice_address + num_tiles_in_slice_minus1;
  tileIdx++ ) {
    tileX = tileIdx % NumTileColumns
    tileY = tileIdx / NumTileColumns
    for ( ctbY = tileRowBd[ tileY ]; ctbY < tileRowBd[ tileY + 1 ]; ctbY++ ) {
      for ( ctbX = tileColBd[ tileX ]; ctbX < tileColBd[ tileX + 1 ];
ctbX++ ) {
  CtbAddrInCurrSlice[ NumCtusInCurrSlice ] =
ctbY * PicWidthInCtb + ctbX
        NumCtusInCurrSlice++
      }
    }
  }
}
```

Variables SubpicLeftBoundaryPos, SubpicTopBoundaryPos, SubpicRightBoundaryPos, and SubpicBotBoundaryPos may be derived according to the following algorithm.

TABLE 3

```
if ( subpic_treated_as_pic_flag[ CurrSubpicIdx ] ) {
   SubpicLeftBoundaryPos = subpic_ctu_top_left_x[ CurrSubpicIdx ] * CtbSizeY
   SubpicRightBoundaryPos = Min( pic_width max_in_luma_samples − 1,
      ( subpic_ctu_top_left_x[ CurrSubpicIdx ] +
      subpic_width_minus1[ CurrSubpicIdx ] + 1 ) * CtbSizeY − 1 )
   SubpicTopBoundaryPos = subpic_ctu_top_left_y[ CurrSubpicIdx ] *CtbSizeY
   SubpicBotBoundaryPos = Min( pic_height_max_in_luma_samples − 1,
      ( subpic_ctu_top_left_y[ CurrSubpicIdx ] +
      subpic_height_minus1[ CurrSubpicIdx ] + 1 ) * CtbSizeY − 1 )
}
```

Improvement of Picture Partitioning Signaling

Signaling related to picture partitioning described above has a problem that unnecessary information is signaled when a slice is a rectangular slice. For example, when the slice is a quadrangular (e.g., rectangular) slice, the width of an individual slice may be signaled in units of tiles. However, when the top-left tile of the slice is a tile of a last tile column, the width of the slice may not be a value other than one tile unit. For example, in this case, the width of the slice may have only a width value derived in one tile unit. Accordingly, the width of such a slice may not be signaled or may be limited to one tile unit.

Similarly, when the slice is a quadrangular (e.g., rectangular) slice, the width of an individual slice may be signaled in tile units. However, when a tile at a top-left position of a slice is a tile of a last tile row, the height of the slice may not be a value other than one tile unit. Accordingly, the height of such a slice may not be signaled or may be limited to one tile unit.

The following method is applicable in order to solve the above-described problems. The following embodiment is applicable when the slice is a quadrangular (e.g., rectangular) slice and the width and/or height of an individual slice are signaled in units of tiles. The following methods may be individually applied or may be combined with at least one other embodiment.

Method 1. When a first tile (e.g., a tile of a top-left corner) of a rectangular slice is a tile located at a last tile column of a picture, signaling of the width of the slice may not be provided. In this case, the width of the slice may be derived as one tile unit.

For example, a syntax element slice_width_in_tiles_minus1[i] may not be present in a bitstream. The value of the syntax element slice_width_in_tiles_minus1[i] may be derived as 0.

Method 2. Even when a first tile (e.g., a tile of a top-left corner) of a rectangular slice is a tile located at a last tile column of a picture, signaling of the width of the slice may be provided. However, in this case, the width of the slice may be limited to one tile unit.

For example, syntax element slice_width_in_tiles_minus1[i] may be present in a bitstream and thus parsed. However, the value of the syntax element slice_width_in_tiles_minus1[i] may be limited to 0.

Method 3. When a first tile (e.g., a tile of a top-left corner) of a rectangular slice is a tile located at a last tile row of a picture, signaling of the height of the slice may not be provided. In this case, the height of the slice may be derived as one tile unit.

For example, a syntax element slice_height_in_tiles_minus1[i] may not be present in a bitstream. The value of the syntax element slice_height_in_tiles_minus1[i] may be derived as 0.

Method 4. When a first tile (e.g., a tile of a top-left corner) of a rectangular slice is a tile located at a last tile row of a picture, signaling of the height of the slice may be provided.

However, in this case, the height of the slice may be limited to one tile unit.

For example, a syntax element slice_height_in_tiles_minus1[i] may be present in a bitstream and thus parsed. However, the value of the syntax element slice height_in_tiles_minus1[i] may be limited to be equal to 0.

Figure 29:
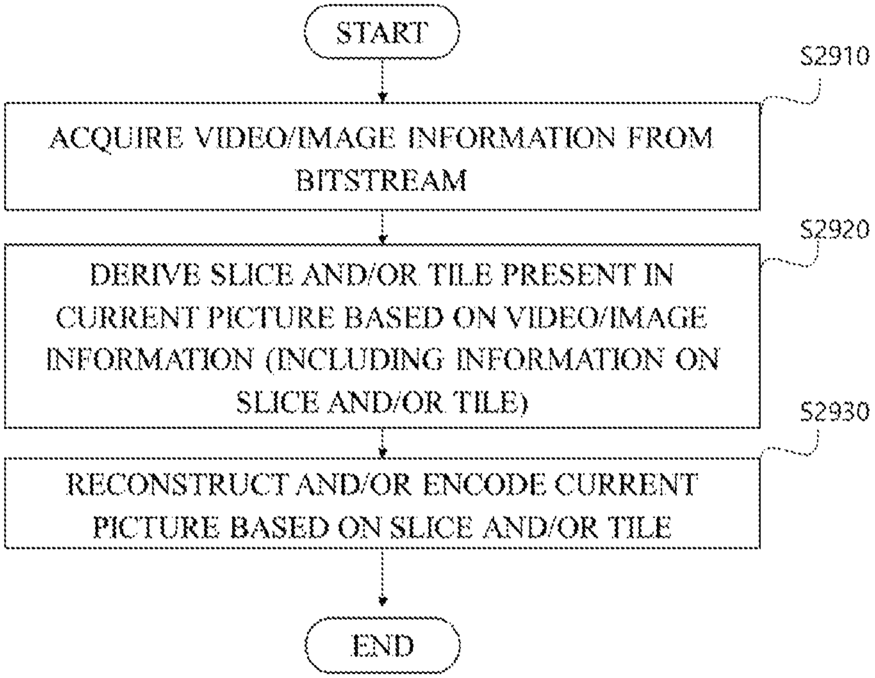

In one embodiment, the above-described embodiments are applicable to the encoding and decoding method as shown in FIGS. 28 and 29. The encoding apparatus according to one embodiment may derive a slice and/or a tile in a current picture (S2810). In addition, the encoding apparatus may encode the current picture based on the derived slice and/or tile (S2820).

Similarly, the decoding apparatus according to an embodiment may acquire video/image information from a bitstream (S2910). In addition, the decoding apparatus may derive a slice and/or a tile present in a current picture based on video/image information (including information on the slice and/or the tile) (S2920). In addition, the decoding apparatus may reconstruct and/or decode the current picture based on the slice and/or the tile (S2930).

For the above processing of the encoding apparatus and the decoding apparatus, the information on the slice and/or the tile may include the above-described information and syntax. Video or image information may include a HLS. The HLS may include information on a slice and/or information on a tile. The HLS may further include information on a subpicture. The information on the slice may include information specifying at least one slice belonging to a current picture. In addition, the information on the tile may include information specifying at least one tile belonging to a current picture. The information on the subpicture may include information specifying at least one subpicture belonging to a current picture. A tile including at least one slice may be present in one picture.

For example, in S2930 of FIG. 29, the current picture may be reconstructed and/or decoded based on the derived slice and/or tile. By partitioning one picture, it is possible to obtain encoding and decoding efficiency in various aspects.

For example, a picture may be partitioned for parallel processing and error resilience. In the case of parallel processing, some embodiments performed in a multi-core CPU may require partitioning of a source picture into tiles and/or slices. Individual slices and/or tiles may be processed in parallel in different cores. This is very efficient in order to perform high-resolution real-time video coding which cannot be performed by other methods. In addition, such portioning has an advantage of reducing constraints on a memory, by reducing information shared between tiles. Since tiles are distributed to different threads while parallel processing is performed, a parallel architecture has usefulness by a partitioning mechanism thereof. For example, in a process of deriving motion information in inter prediction, neighboring blocks present in different slices and/or tiles may be limited not to be used. Context information used to encode information and/or a syntax element may be initialized for each slice and/or tile.

Error resilience may be caused by applying unequal error protection (UEP) to the encoded tile and/or slice.

Embodiment 1

Hereinafter, an embodiment based on Methods 1 and 3 described above will be described. The following embodiment may be applied in order to improve an encoding/decoding technique such as VVC specification.

In one embodiment, a syntax table for signaling a picture parameter set may be set as shown in FIG. 30. In another embodiment, a syntax table for signaling a picture parameter set may be set as shown in FIG. 31.

In the embodiment of FIG. 30, for i having a value from 0 to num_slices_in_pic_minus1-1, when the value of NumTileColumns is greater than 1 and the value of SliceTopLeftTileIdx[i] % NumTileColumns is not NumTileColumns−1, a syntax element slice_width_in_tiles_minus1[i] may be sequentially acquired with respect to i.

In addition, for i having a value from 0 to num_slices_in_pic_minus1-1, when the value of NumTileRows is greater than 1, the value of tile_idx_delta_present_flag is 1 or the value of SliceTopLeftTileIdx[i] % NumTileColumns is 0 and the value of SliceTopLeftTileIdx[i]/NumTileColumns is not NumTileRows−1, a syntax element slice_height_in_tiles_minus1[i] may be sequentially acquired with respect to i.

In the embodiment of FIGS. 30 and 31, a syntax element slice_width_in_tiles_minus1[i] may be a syntax element indicating the width of an i-th rectangular slice. For example, a value obtained by adding 1 to slice_width_in_tiles_minus1[i] may indicate the width of an i-th rectangular slice in units of tile columns. The value of slice_width_in_tiles_minus1[i] may have a value from 0 to NumTileColumns−1. When slice_width_in_tiles_minus1[i] is not acquired from a bitstream, the value of slice_width_in_tiles_minus1[i] may be derived as 0.

When definition of slice_width_in_tiles_minus1[i] is changed as above, constraints that, "when i is less than num_slices_in_pic_minus1 and the value of NumTileColumns is equal to 1, the value of slice_width_in_tiles_minus1[i] is derived as 0" may be omitted. Therefore, as in the embodiment of FIG. 31, a condition "NumTileColumns>1" may be deleted from a picture parameter set syntax.

slice_height_in_tiles_minus1[i] may be a syntax element indicating the height of an i-th rectangular slice. For example, when the value of num_exp_slices_in_tile[i] is 0, a value obtained by adding 1 to slice_height_in_tiles_minus1[i] may indicate the height of an i-th rectangular slice in units of tile rows. The value of slice_height_in_tiles_minus1[i] may have a value from 0 to NumTileRows−1.

When slice_height_in_tiles_minus1[i] is not acquired from a bitstream, the value of slice_height_in_tiles_minus1[i] may be derived as follows.

First, when the value of NumTileRow is 1 or the value of SliceTopLeftTileIdx[i] % NumTileColumns is NumTileColumns−1, the value of slice_height_in_tiles_minus1[i] may be derived as 0.

Otherwise (e.g., when the value of NumTileRow is not 1 and the value of SliceTopLeftTileIdx[i] % NumTileColumns is not NumTileColumns−1), the value of slice_height_in_tiles_minus1[i] may be derived as slice_height_in_tiles_minus1[i−1]. For example, the value of slice_height_in_tiles_minus1[i] may be set to slice_height_in_tiles_minus1[i−1] which is the height value of a previous slice. For example, the values of slice_height_in_tiles_minus1[i] of all slices in one tile may be equally set.

When definition of slice_height_in_tiles_minus1[i] is changed as above, an existing constraint that, when "i is less than num_slices_in_pic_minus1 and the value of NumTileRows is equal to 1, the value of slice_width_in_tiles_minus1[i] is derived as 0" may be omitted. Therefore, as in the embodiment of FIG. 31, a condition "NumTileRows>1" may be deleted from a picture parameter set syntax.

Embodiment 2

Hereinafter, an embodiment based on Methods 2 and 4 described above will be described. The following embodiment may be applied in order to improve an encoding/decoding technique such as VVC specification.

In one embodiment, slice_width_in_tiles_minus1[i] may be a syntax element indicating the width of an i-th rectangular slice. For example, a value obtained by adding 1 to slice_width_in_tiles_minus1[i] may indicate the width of an i-th rectangular slice in units of tile columns. The value of slice_width_in_tiles_minus1[i] may have a value from 0 to NumTileColumns−1. When slice_width_in_tiles_minus1[i] is not acquired from a bitstream, the value of slice_width_in_tiles_minus1[i] may be derived as 0.

At this time, when i is less than num_slices_in_pic_minus1 and the value of NumTileColumns is equal to 1, the value of slice_width_in_tiles_minus1[i] may be derived as 0. In addition, for bitstream conformance, when a first tile of an i-th rectangular slice is a last tile of a tile column, the value of slice_width_in_tiles_minus1[i] may be forced to be 0.

slice_height_in_tiles_minus1[i] may be a syntax element indicating the height of an i-th rectangular slice. For example, when the value of num_exp_slices_in_tile[i] is 0, a value obtained by adding 1 to slice_height_in_tiles_minus1[i] may indicate the height of an i-th rectangular slice in units of tile rows. The value of slice_height_in_tiles_minus1[i] may have a value from 0 to NumTileRows−1.

At this time, when i is less than num_slices_in_pic_minus1 and the value of slice_height_in_tiles_minus1[i] is not acquired from a bitstream, the value of slice_height_in_tiles_minus1[i] may be determined according to the value of NumTileRows. For example, this may be determined as shown in the following Equation.

$$\text{slice\_height\_in\_tiles\_minus1}[i] = NumTileRows == 1\,?\,0 : \text{slice\_height\_in\_tiles\_minus1}[i-1] \quad \text{[Equation 2]}$$

In addition, for bitstream conformance, when a first tile of an i-th rectangular slice is a last tile of a tile row, the value of slice_height_in_tiles_minus1[i] may be forced to be 0.

Encoding and Decoding Method

Hereinafter, an image encoding and decoding method performed by an image encoding apparatus and an image decoding apparatus according to an embodiment will be described.

Figure 32:
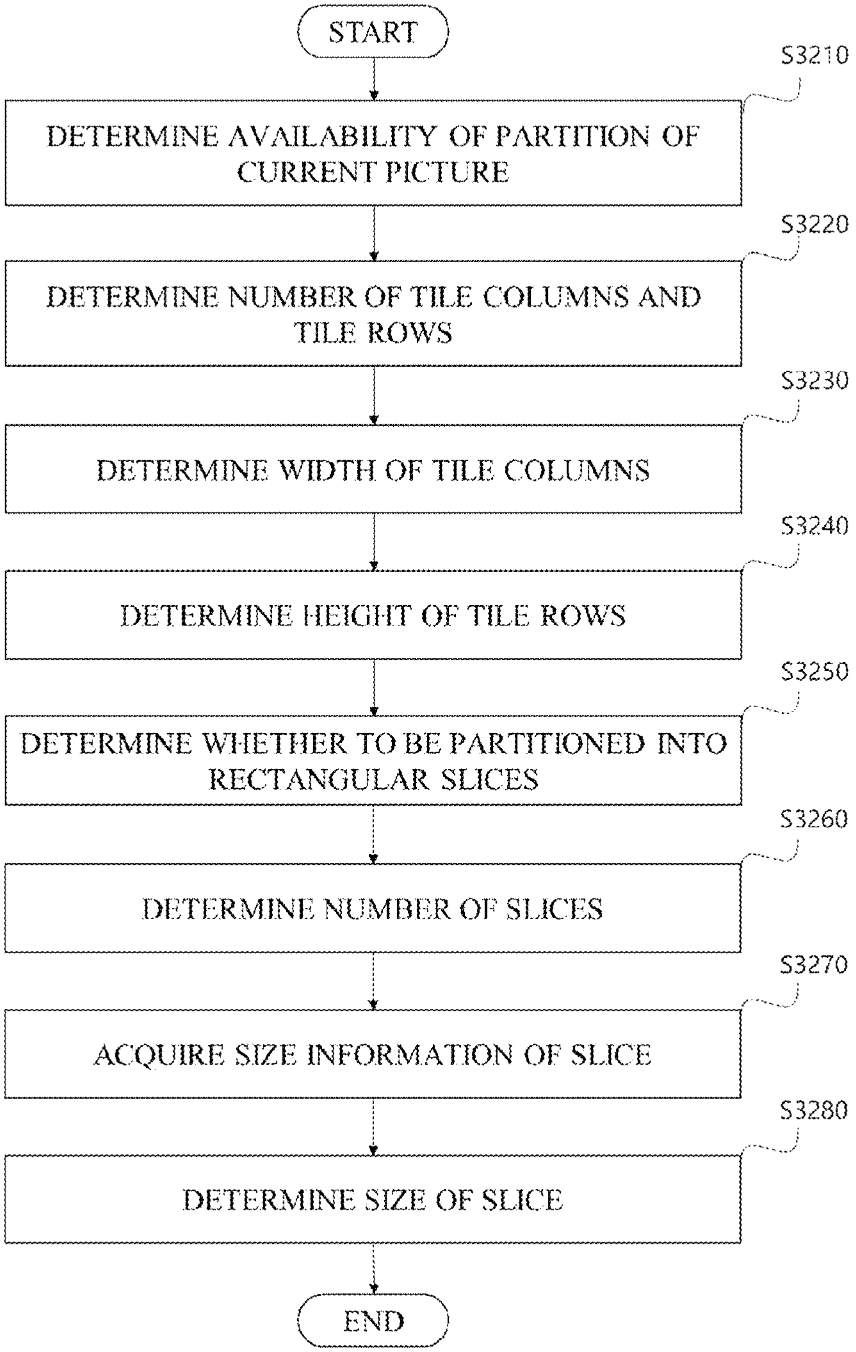
FIG. 32 is a view showing an embodiment of a decoding method.

First, operation of the decoding apparatus will be described. An image decoding apparatus according to an embodiment may include a memory and a processor, and the decoding apparatus may perform decoding by operation of a processor. FIG. 32 is a view showing an embodiment of a decoding method according to an embodiment.

The decoding apparatus according to an embodiment may acquire a syntax element no_pic_partition_flag indicating availability of partitioning of a current picture from a bitstream. The decoding apparatus may determine availability of partitioning of the current picture based on the value of no_pic_partition_flag as described above (S3210).

When partitioning of the current picture is available, the decoding apparatus may acquire, from a bitstream, a syntax element num_exp_tile_rows_minus1 indicating the number of tile rows partitioning a current picture and a syntax element num_exp_tile_columns_minus1 indicating the number of tile columns, and determine the number of tile rows and columns from the same as described above (S3220).

Based on the number of tile columns, the decoding apparatus may acquire, from a bitstream, a syntax element tile_column_width_minus1 indicating the width of each tile column partitioning the current picture, and determine the width of each tile column from the same as described above (S3230).

Based on the number of tile rows, the decoding apparatus may acquire, from a bitstream, a syntax element tile_row_height_minus1[i] indicating the height of each tile row partitioning the current picture, and determine the height of each tile row from the same (S3240). In addition, the decoding apparatus may calculate the number of tiles partitioning a current picture by a product of the number of tile columns and the number of tile rows.

Next, the decoding apparatus may acquire a syntax element rect_slice_flag indicating whether the current picture is partitioned into rectangular slices based on whether the number of tiles partitioning the current picture is greater than 1, and determine whether the current picture is partitioned into rectangular slices from the value thereof as described above (S3250).

Next, the decoding apparatus may acquire, from a bitstream, a syntax element num_slices_in_pic_minus1 indicating the number of slices partitioning the current picture based on whether the current picture is partitioned into rectangular slices, and determine the number of slices partitioning the current picture from the same as described above (S3260).

Next, the decoding apparatus may acquire, from the bitstream, size information indicating the size of each slice partitioning the current picture from a bitstream as many as the number of slices partitioning the current picture (S3270).

Here, the size information may include a syntax element slice_width_in_tiles_minus1[i] which is width information indicating the width of the slice and a syntax element slice_height_in_tiles_minus1[i] which is height information indicating the height of the slice. slice_width_in_tiles_minus1[i] may indicate the width of the slice in units of tile columns and slice_height_in_tiles_minus1[i] may indicate the height of the slice in units of tile rows.

Here, when the decoding apparatus acquires size information of a current slice (e.g., an i-th slice) from a bitstream, the decoding apparatus may acquire slice_width_in_tiles_minus1[i] from the bitstream based on whether a top-left tile of a current slice belongs to a last tile column of the current picture.

For example, when a top-left tile index (e.g., SliceTopLeftTileIdx) of the current slice is not a tile index corresponding to a last column of a tile column belonging to the current picture, slice_width_in_tiles_minus1[i] may be acquired from the bitstream. However, when the top-left tile index of the current slice is a tile index corresponding to a last column of a tile column belonging to the current picture, slice_width_in_tiles_minus1[i] may not be acquired from the bitstream and may be determined to be 0.

Similarly, the decoding apparatus may acquire slice_height_in_tiles_minus1[i] from the bitstream based on whether the top-left tile of a current slice belongs to a last tile row of the current picture.

For example, when the top-left tile index of the current slice is not a tile index corresponding to a last row of a tile row belonging to the current picture, slice_height_in_tiles_minus1[i] may be acquired from the bitstream. However, when the top-left tile index of the current slice is a tile index corresponding to a last row of a tile row belonging to the current picture, slice_height_in_tiles_minus1[i] may not be acquired from the bitstream and may be determined to be 0.

Next, the decoding apparatus may determine the size of each slice partitioning the current picture based on the size information and decode the determined slice, thereby decoding the image. For example, a CTU included in a slice having the determined size may be decoded using inter or intra prediction, thereby decoding the slice (S3280).

Meanwhile, SliceTopLeftTileIdx may be a variable indicating a top-left tile of a slice and may be determined by the algorithm of FIGS. 33 and 34. The algorithm of FIGS. 33 and 34 is one consecutive algorithm.

Figure 35:
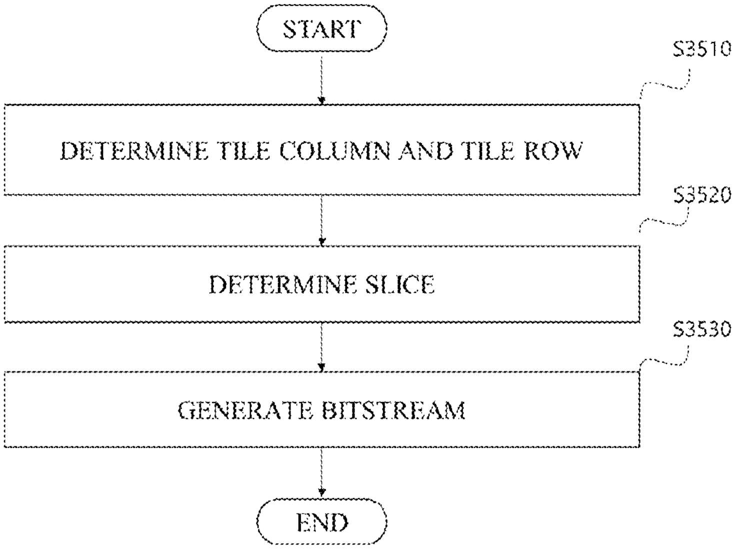
FIG. 35 is a view showing an embodiment of an encoding method.

Next, operation of the encoding apparatus will be described. An image encoding apparatus according to an embodiment may include a memory and a processor, and the encoding apparatus may perform encoding in a manner corresponding to the decoding of the decoding apparatus by operation of the processor. For example, as shown in FIG. 35, the encoding apparatus may encode a current picture. First, the encoding apparatus may determine a tile column and a tile row for a current picture (S3510). Next, a slice partitioning an image may be determined (S3520). Next, the encoding apparatus may generate a bitstream including predetermined information including size information of a slice (S3530). For example, the encoding apparatus may generate a bitstream including no_pic_partition_flag, num_exp_tile_rows_minus1, num_exp_tile_columns_minus1, tile_column_width_minus1, tile_row_height_minus1[i], rect_slice_flag, num_slices_in_pic_minus1, slice_width_in_tiles_minus1[i] and slice_height_in_tiles_minus1[i] which are syntax elements acquired from a bitstream by the decoding apparatus.

At this time, the size information may be included in a bitstream based on whether the current slice belongs to a last tile column or a last tile row of the current picture. For example, the encoding apparatus may encode a bitstream based on whether a top-left tile of a current slice is a last tile column and/or a last tile row, such that slice_width_in_tiles_minus1[i] and slice_height_in_tiles_minus1[i] correspond to the description of the decoding apparatus. Here, the current slice may be a rectangular slice.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 36:
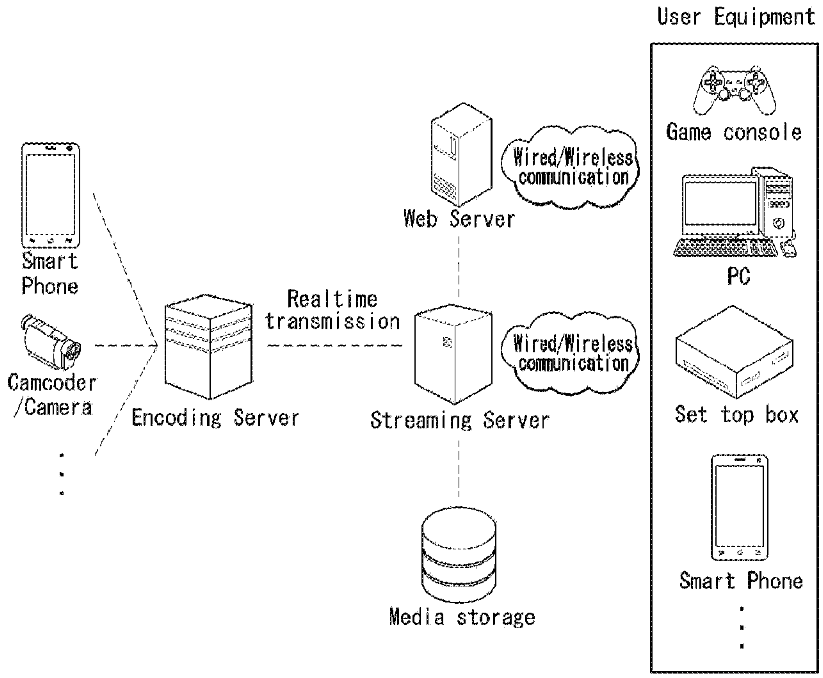
FIG. 36 is a view showing a content streaming system, to which an embodiment of the present disclosure is applicable.

FIG. 36 is a view showing a content streaming system, to which an embodiment of the present disclosure is applicable.

As shown in FIG. 36, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

acquiring size information indicating a size of a current slice corresponding to at least a portion of a current picture from a bitstream; and determining the size of the current slice based on the size information, wherein the size information includes width information indicating a width of the current slice in units of tile columns and height information indicating a height of the current slice in units of tile rows, wherein the acquiring the size information is performed based on whether the current slice belongs to a last tile column or a last tile row of the current picture, wherein the height information of the current slice is not acquired from the bitstream based on whether a top left tile of the current slice belongs to a last tile row of the current picture, and wherein the width information of the current slice is not acquired from the bitstream based on whether a top left tile of the current slice belongs to a last tile column of the current picture, wherein the acquiring the size information is performed based on the number of slices partitioning the current picture, wherein the number of slices partitioning the current picture is determined by:

determining availability of partitioning of the current picture;

determining the number of tile rows and the number of tile columns, both of which partition the current picture, based on the availability of the partitioning of the current picture;

determining a width of each tile column partitioning the current picture based on the number of tile columns;

determining a height of each tile row partitioning the current picture based on the number of tile rows;

determining whether the current picture is partitioned into rectangular slices based on the number of tiles partitioning the current picture; and acquiring the number of slices partitioning the current picture from a bitstream based on whether the current picture is partitioned into rectangular slices.

2. The image decoding method of claim 1, wherein the height information of the current slice is acquired from the bitstream based on a top left tile of the current slice not belonging to a last tile row of the current picture.

3. The image decoding method of claim 1, wherein the height information of the current slice is not acquired from the bitstream and is determined to be a predetermined value based on a top left tile of the current slice belonging to a last tile row of the current picture.

4. The image decoding method of claim 3, wherein the predetermined value indicates one tile row.

5. The image decoding method of 1, wherein the current slice is a rectangular slice.

6. An image encoding method performed by an image encoding apparatus, the image encoding method comprising:

determining a current slice corresponding to at least one a portion of a current picture; and generating a bitstream including size information of the current slice, wherein the size information includes width information indicating a width of the current slice in units of tile columns and height information indicating a height of the current slice in units of tile rows, wherein the generating the bitstream is performed based on whether the current slice belongs to a last tile column or a last tile row of the current picture, wherein the height information of the current slice is not encoded in the bitstream based on a top left tile of the current slice belonging to a last tile row of the current picture, and wherein the width information of the current slice is not encoded in the bitstream based on a top left tile of the current slice belonging to a last tile column of the current picture, wherein the size information is encoded based on the number of slices partitioning the current picture, wherein the number of slices partitioning the current picture is determined by:

determining availability of partitioning of the current picture;

determining the number of tile rows and the number of tile columns, both of which partition the current picture, based on the availability of the partitioning of the current picture;

determining a width of each tile column partitioning the current picture based on the number of tile columns;

determining a height of each tile row partitioning the current picture based on the number of tile rows;

determining whether the current picture is partitioned into rectangular slices based on the number of tiles partitioning the current picture; and encoding the number of slices partitioning the current picture into the bitstream based on whether the current picture is partitioned into rectangular slices.

7. The image encoding method of claim 6, wherein the current slice is a rectangular slice.

8. A method of transmitting a bitstream, the method comprising:

generating a bitstream based on an image encoding method; and transmitting the bitstream, the image encoding method comprising:

determining a current slice corresponding to at least one a portion of a current picture; and generating a bitstream including size information of the current slice, wherein the size information includes width information indicating a width of the current slice in units of tile columns and height information indicating a height of the current slice in units of tile rows, wherein the generating the bitstream is performed based on whether the current slice belongs to a last tile column or a last tile row of the current picture, wherein the height information of the current slice is not encoded in the bitstream based on a top left tile of the current slice belonging to a last tile row of the current picture, and wherein the width information of the current slice is not encoded in the bitstream based on a top left tile of the current slice belonging to a last tile column of the current picture, wherein the size information is encoded based on the number of slices partitioning the current picture, wherein the number of slices partitioning the current picture is determined by:

determining availability of partitioning of the current picture;

determining the number of tile rows and the number of tile columns, both of which partition the current picture, based on the availability of the partitioning of the current picture;

determining a width of each tile column partitioning the current picture based on the number of tile columns;

determining a height of each tile row partitioning the current picture based on the number of tile rows;

determining whether the current picture is partitioned into rectangular slices based on the number of tiles partitioning the current picture; and encoding the number of slices partitioning the current picture into the bitstream based on whether the current picture is partitioned into rectangular slices.

* * * * *